(12) United States Patent
Kou et al.

(10) Patent No.: US 8,464,926 B2
(45) Date of Patent: Jun. 18, 2013

(54) METHOD OF FRICTION STIR WELDING DISSIMILAR METALS AND WORKPIECE ASSEMBLIES FORMED THEREBY

(75) Inventors: Sindo Kou, Madison, WI (US); Vahid Firouzdor, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 318 days.

(21) Appl. No.: 12/589,948

(22) Filed: Oct. 30, 2009

(65) Prior Publication Data

US 2011/0104515 A1    May 5, 2011

(51) Int. Cl.
*B23K 20/12* (2006.01)
(52) U.S. Cl.
USPC ........................................ 228/112.1; 428/615
(58) Field of Classification Search
USPC ........................................ 228/112.1; 428/615
See application file for complete search history.

(56) References Cited

U.S. PATENT DOCUMENTS

| 7,078,647 | B2 | 7/2006 | Kou et al. | |
| 2006/0060635 | A1* | 3/2006 | Slattery et al. | 228/112.1 |
| 2006/0273140 | A1* | 12/2006 | Ghosh | 228/112.1 |
| 2008/0006678 | A1 | 1/2008 | Packer et al. | |
| 2009/0266870 | A1* | 10/2009 | Yousefiani et al. | 228/112.1 |

OTHER PUBLICATIONS

Siemssen, Brandon Raymond, Development and Characterization of Friction Bit Joining: A New Solid State Spot Joining Technology Applied to Dissimilar Al/Steel Joints, Thesis submitted to the faculty of Brigham Young University, School of Technology, Aug. 2008, 82 pages, Provo, Utah, US.
M. K. Kulekci, "Magnesium and its alloys applications in automotive industry," International Journal of Advanced Manufacturing Technology, in press (DOI 10.1007/s00170-007 -1279-2).
A. Gerlich, P. Su and T. H. North, "Peak temperatures and microstructures in Al and Mg alloy FSW spot welds," Science and Technology of Welding and Joining, vol. 10, 2005, pp. 647-652.
"High peel strength laser lap welding," TC and Laserfactures, Laserfacturing Inc., www.TCLLaser.com ., 2008.
Y. C. Chen and K. Nakata, Friction stir joining aluminum and magnesium alloys, Scripta Materialia, vol. 58, 2008, pp. 433-436.
A. A. McLean, G. L. F. Powell, I. 11. Brown and V. M. Linton, "Friction stir welding of magnesium alloy AZ31 B to aluminum alloy 5083," Science and Technology of Welding and Joining, vol. 8, No. 6, 2003, pp. 462-464.

(Continued)

*Primary Examiner* — Nicholas P D'Aniello
(74) *Attorney, Agent, or Firm* — Armstrong Teasdale LLP

(57) ABSTRACT

In a process for friction stir welding together pieces of dissimilar material, a first piece of a second metal is overlaid onto a first piece of a first metal that is dissimilar from the second metal such that at least a portion of the first piece of second metal overlaps a portion of the first piece of first metal. A second piece of the first metal is placed in side-to-side relationship with the first piece of second metal and overlies another portion of the first piece of first metal. The relative arrangement between the second piece of first metal and the first piece of second metal define a joint line overlying the first piece of first metal. The first piece of first metal, the first piece of second metal, and the second piece of first metal are friction stir welded together along the joint line.

15 Claims, 27 Drawing Sheets
(5 of 27 Drawing Sheet(s) Filed in Color)

OTHER PUBLICATIONS

S. Hirano, K. Okamoto, M. Doi, 11. Okamura, M. Inagaki and Y. Aono, "Microstructure of dissimilar joint interface of magnesium alloy and aluminum alloy by friction stir welding," Journal of Japan Welding Society, 2003, vol. 21, No. 4, pp. 539-545.

S. Hirano, K. Okamoto, M. Doi, II. Okamura, M. Inagaki and Y. Aono, "Microstructure of the interface in magnesium alloy to aluminum alloy dissimilar joints produced by friction stir welding," Welding International, 2004, vol. 18, No. 9, pp. 702-708.

A. C. Somasekharan and L. F. Murr, "Characterization of complex, solid-state flow and mixing in the friction-stir welding (FSW) of aluminum alloy 6061-T6 to magnesium alloy using color metallography," Journal of Materials Science, vol. 41, 2006, pp. 5365-5370.

Y. Sato, S. H. C. Park, M. Michiuchi and H. Kokawa, "Constitutional liquation during dissimilar friction stir welding of Al and Mg alloys," Scripta Materialia, vol. 50, 2004, pp. 1233-1236.

Z. Zhang and H. W. Zhang, "Numerical studies on controlling of process parameters in friction stir welding," Journal of Materials Processing Technology, vol. 209, 2009, pp. 241-270.

J. Yan, Z. Xu, Z. Li, L. Li and S. Yang, "Microstructure characteristics and performance of dissimilar welds between magnesium alloy and aluminum formed by friction stirring," Scripta Materialia, vol. 53, 2005, pp. 585-589.

R. Zettler, J. F. Dos Santos, A. Blanco, A. da Silva, "A study on dissimilar friction stir welds between Al and Mg alloys," Proceedings of the 7 International Conference on Trends in Welding Research, May 16-20, 2005, ASM International, pp. 413-419.

R. Zettler, A. A. M. da Silva, S. Rodrigues, A. Blanco and J. F. de Santos, Dissimilar Al to Mg Alloy Friction Stir Welds, Advanced Engineering Materials, vol. 8, No. 5, 2006, pp. 415-421.

Y. J. Kwon, I. Shigcmatsu and N. Sato, Dissimilar friction stir welding between magnesium and aluminum alloys, Materials Letters, vol. 62, 2008, pp. 3827-3829.

A. Kostka, R. S. Coelho, J. dos Santos and A. R. Pyzalla, "Microstructure of friction stir welding of aluminum alloy to magnesium alloy," Scripta Materialia, 2009, doi: 10.1016/j.scriptamat.2009.02.020.

American Society for Metals. 1986. Binary Alloy Phase Diagrams vol. 1: p. 106, Metals Park, O.H., American Society for Metals.

Pepe, J. J., and Savage, W. F. 1967. Effects of Constitutional Liquation in 18-Ni Maraging Steel Wcldmcnt. Welding Journal 46(9): 411-s to 422-s.

Pepe, J. J., and Savage, W. F. 1970. Weld Heat-affected Zone of the 18Ni Maraging Steels. Welding Journal 49(12): 545-s to 553-s.

S. Kou, Formation of the Partially Melted Zone, Welding Metallurgy, 2' edition, John Wiley and Sons, New York, NY, 2003, pp. 303-339.

Y. K. Yang, H. Dong, H. Cao, Y. A. Chang and S. Kou, "Liquation of Mg Alloys in Friction Stir Spot Welding," Welding Journal, vol. 87, 2008, pp. 167s-177s.

X. Liu, J. Cui, X. Wu, Y. Guo and J. Zhang, "Phase growth in diffusion couples under a low frequency alternating magnetic field," Scripta Materialia, 52: 2005, 79-82.

P. Su, A. Gerlich, T. H. North and G. J. Bendzsak, "Energy generation and stir zone dimensions in friction stir spot welding," paper 2006-01-0971, SAE International.

K. Nakada and M. Ushio, "Needs and prospects of dissimilar metal joining and welding," Journal of Japan Welding Society, vol. 71, No. 6, pp. 6-9, 2002.

R. Nandan, G. G. Roy and T. DebRoy, "Numerical simulation of three-dimensional heat transfer and plastic flow during friction stir welding," Metallurgical and Materials Transactions A, vol. 37A, 2006, pp. 1247-1259.

C. Liu, D. L. Chen, S. Bhole, X. Cao and M. Jahazi, "Polishing-assisted galvanic corrosion in the dissimilar friction stir welded joint of AZ31 magnesium alloy to 2024 aluminum alloy," Materials Characterization, vol. 60, 2009, pp. 370-376.

H. Okamura and K. Aota, "Joining of dissimilar materials with friction stir welding," Welding International, 2004, vol. 18 (11), pp. 852-860.

A. C. Somasekharan and L. E. Murr, "Microstructures in friction stir-welded dissimilar magnesium alloys and magnesium alloys to 6061-T6 aluminum alloy," Materials Characterization, vol. 52, 2004, pp. 49-64.

R. Nandan, T. DebRoy and H. K. D. H. Bhadeshia, "Recent advances in friction stir welding—process, weldment, structure and properties," Progress in Materials Science, vol. 53, 2008, pp. 980-1023.

J. H. Cho, D. E. Boyce and P. R. Dawson, "Modeling strain hardening and texture evolution in friction stir welding of stainless steel," Materials Science and Engineering A, vol. 398, 2005, pp. 146-163.

J. H. Cho, D. E. Boyce and P. R. Dawson, "Modelling strain hardening during friction stir welding of stainless steel," Modelling and Simulation in Materials Science and Engineering, vol. 15, 2007, pp. 469-486.

\* cited by examiner

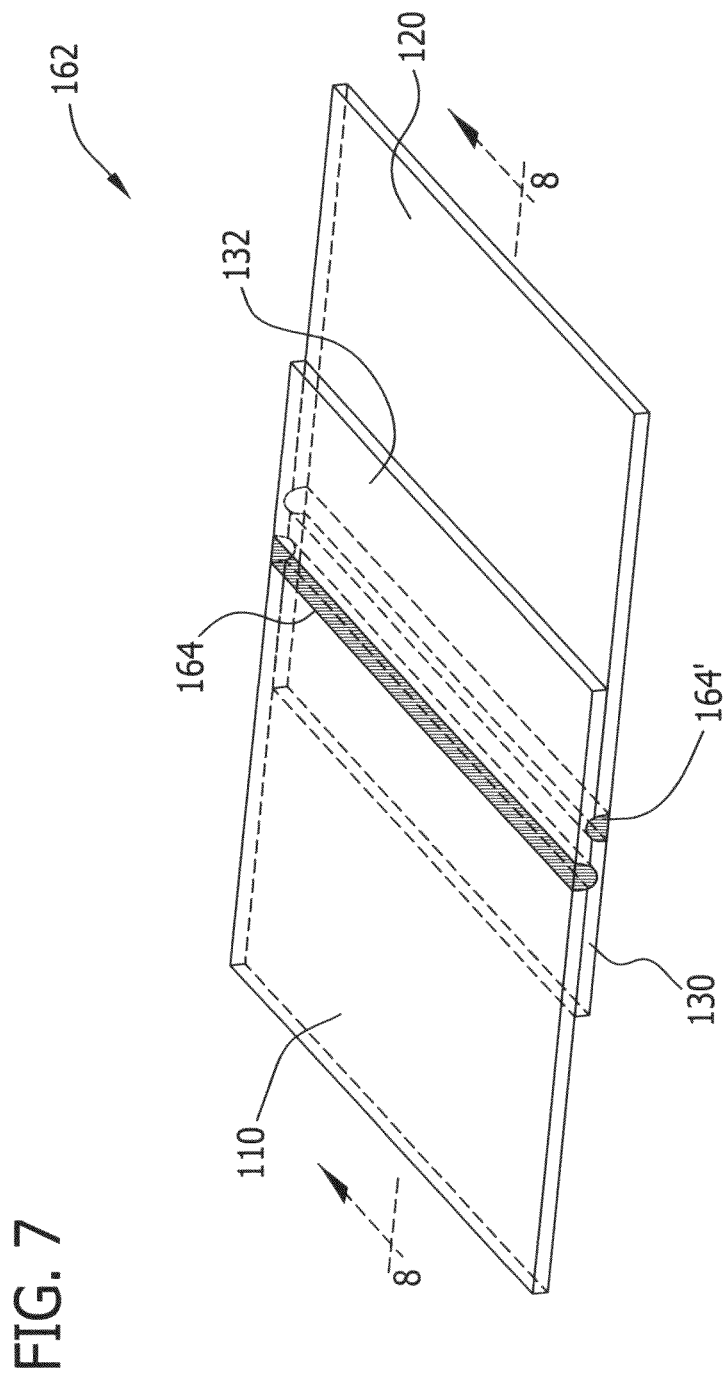

FIG. 12

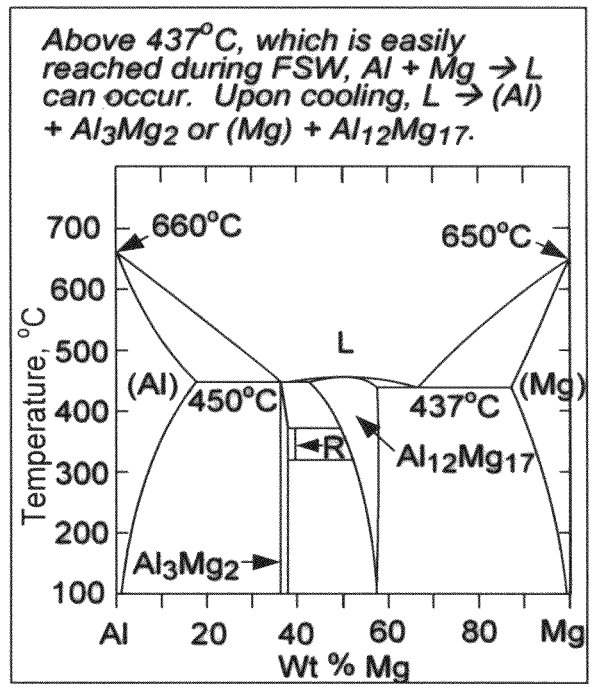

FIG. 13

*Similar-metal butt FSW:*

Fact 1: More heating on advancing side than on retreating side

Fact 2: Higher heat input in 6xxx Al than in AZ or AM Mg

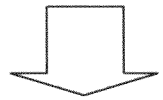

*Dissimilar-metal butt or lap FSW of 6xxx Al to AZ or AM Mg:*

Hypothesis 1. Higher heat input with Al on advancing side.

Hypothesis 2. Higher heat input with larger Al/tool contact area, that is, with tool offset to Al in butt FSW or with Al on top in lap FSW.

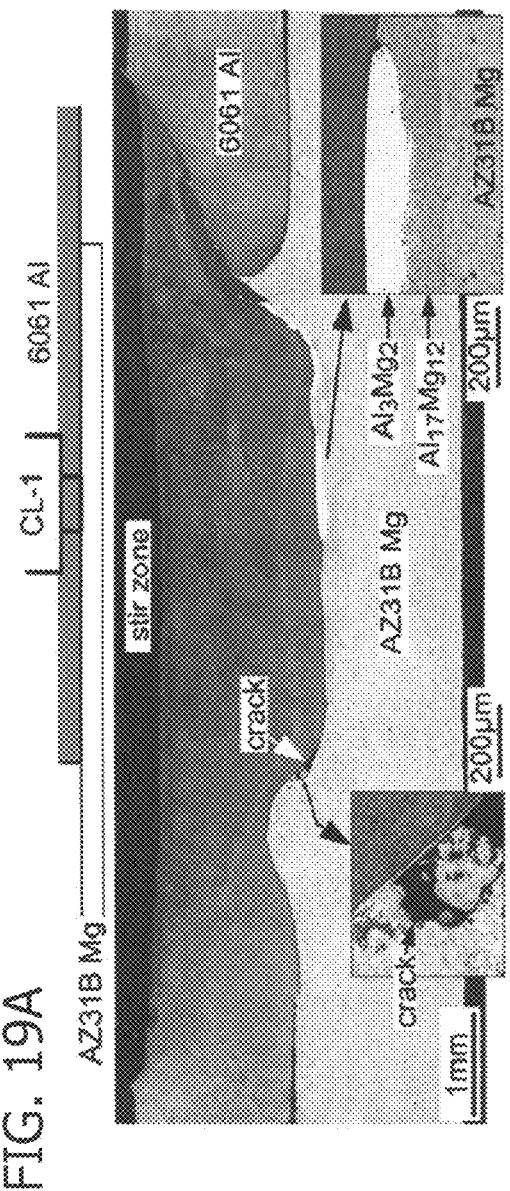
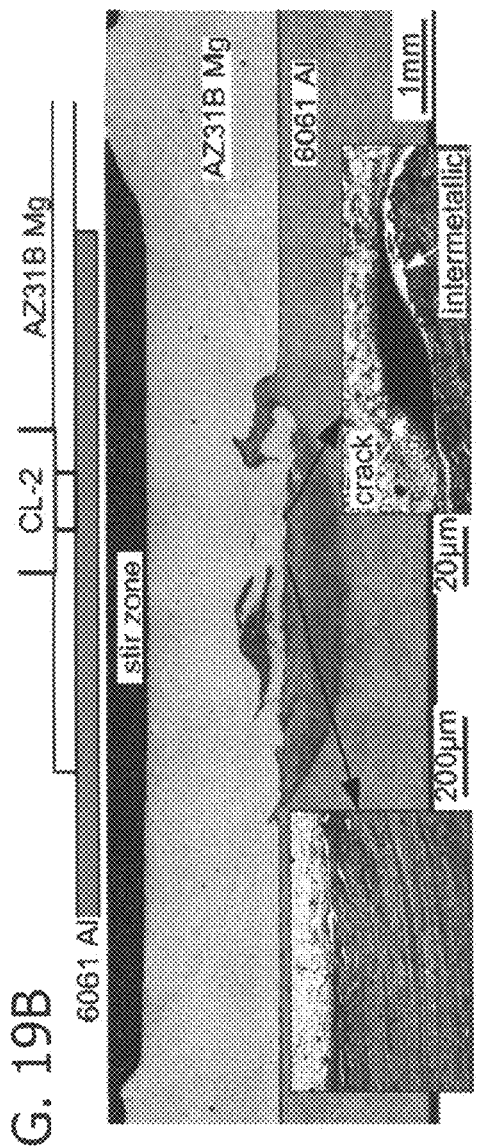
FIG. 19A
FIG. 19B

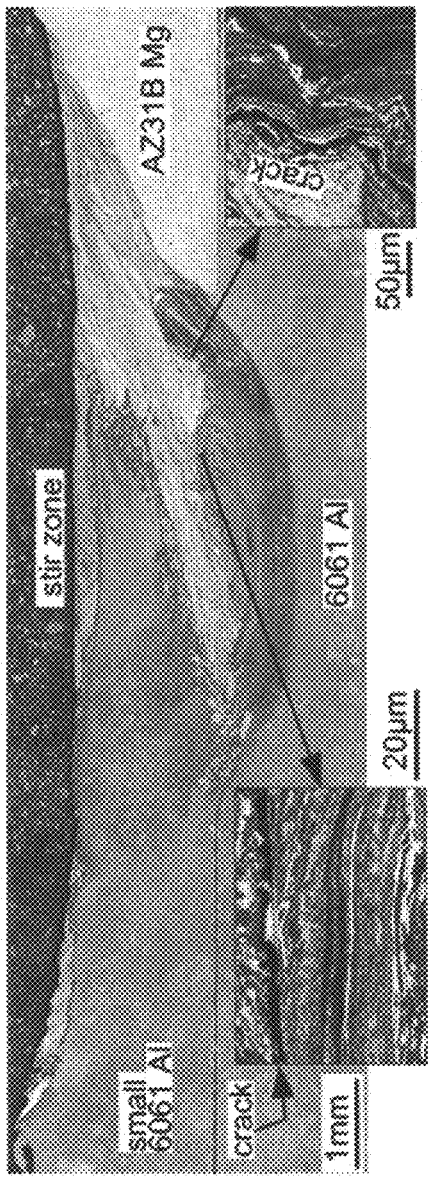
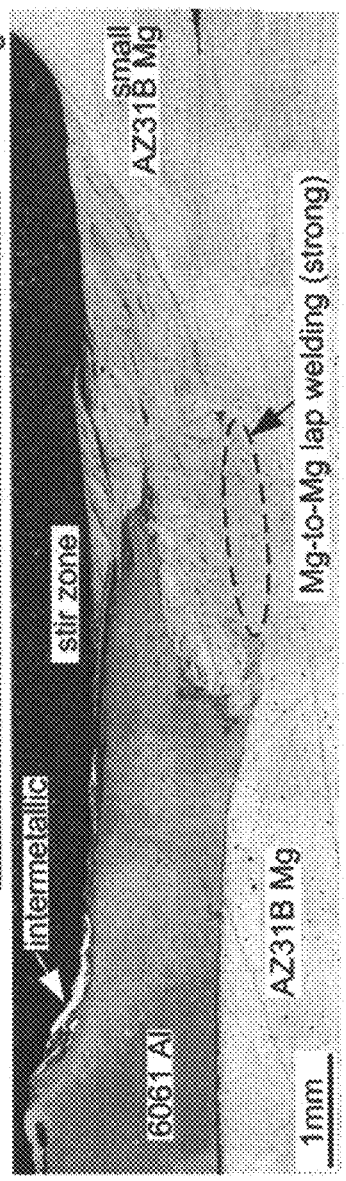
FIG. 24A
FIG. 24B
METHOD OF FRICTION STIR WELDING DISSIMILAR METALS AND WORKPIECE ASSEMBLIES FORMED THEREBY

STATEMENT REGARDING FEDERALLY SPONSORED RESEARCH & DEVELOPMENT

This invention was made with government support under 0605662 awarded by the National Science Foundation. The government has certain rights in the invention.

BACKGROUND

The field of the invention relates generally to friction stir welding and more particularly to friction stir welding of dissimilar metals and to workpiece assemblies formed by friction stir welding dissimilar metals together.

Recent surveys conducted by the Joining and Welding Research Institute (JWRT) of Japan and the Edison Welding Institute (EWI) of the U.S. have identified welding of dissimilar metals as a top priority in materials joining technologies. For instance, being able to weld aluminum-to-copper would be advantageous in many industries where electric connections are made during the manufacturing process. In another instance, being able to weld aluminum-to-steel or aluminum-to-magnesium would result in significant weight reduction in some applications, which would be advantageous in many industries, e.g., the aircraft, locomotive, shipbuilding, and automotive manufacturing industries. Being able to efficiently and effectively weld aluminum-to-magnesium is of particular interest because magnesium has a specific strength (i.e., strength to density ratio) that is 14 percent higher than aluminum and 68 percent higher than iron making it one of the lightest metallic structural materials. Although aluminum and magnesium alloys are typically soft materials and often have relatively similar melting points, they tend to react with each other when heated such as during friction stir welding. The more they are heated up, that is, the more heat input during friction stir welding, the more they react with each other to weaken the resultant weld.

As illustrated in FIGS. 1 and 2, friction stir welding is typically preformed using a cylindrical tool T having a pin P extending downward therefrom. During use, the pin P is rotated at a constant speed and fed at a constant traverse rate along a joint line JL between two pieces of sheet or plate material P1, P2. The pieces P1, P2 can be butt welded (side-to-side) together, as illustrated in FIG. 1, or lap welded (over-lapped) together, as illustrated in FIG. 2. The pin P of the tool T typically has a length that is slightly less than the desired weld depth. During the welding process, a shoulder S of the tool T is often in direct contact with an upper surface of both the pieces P1, P2 being welded. As a result, heat is generated by the friction between the tool shoulder S and pin P and the pieces P1, P2 being welded. This heat causes the pieces P1, P2 to soften about the joint line JL without reaching their melting point. In other words, the friction stir welding process causes both of the pieces P1, P2 to plasticizes adjacent the joint line JL. As the tool T is fed transversely with respect to the pieces P1, P2, a leading face of the pin P directs the plasticized material toward a back of the pin. Angling the pin P by 2-4 degrees in the transverse direction facilitates feeding the pin through the pieces P1, P2 and directing the plasticized material toward the back of the pin.

With reference to FIG. 1, prior efforts have been made to butt weld an aluminum alloy to a magnesium alloy using friction stir welding. In conventional butt welding using friction stir welding, an end of a piece of aluminum alloy (e.g., piece P1) is accurately aligned with and placed against an end of a piece of magnesium alloy (e.g., piece P2) to form a seam or joint line TL. The tool T and thereby the pin P are fed along the joint line JL (i.e., in a longitudinal direction with respect to the two pieces P1, P2 as viewed in FIG. 1). The pin P can be coaxial with the joint line JL or offset toward either the piece of aluminum alloy P1 or the piece of magnesium alloy P2. In addition, the piece of aluminum alloy P1 can be placed on either the advancing side, as illustrated in FIG. 1, or retreating side of the tool T. The piece of magnesium alloy P2 is placed on the opposite side from the piece of aluminum alloy P1. In the illustrated configuration, the piece of magnesium alloy P2 is placed on the retreating side of the tool T. While the butt weld formed between the pieces of aluminum and magnesium alloys P1, P2 can be relatively strong, strict tolerances and controls are needed during the welding process to form such a weld thereby making it difficult, relatively time consuming, and costly.

As illustrated in FIG. 2, prior efforts have also been made to lap weld a piece of aluminum alloy (e.g., piece P1) to a piece of magnesium alloy (e.g., piece P2). Lap welding is typically preferred by manufacturers because the tolerances and controls needed during the welding process are substantially less than those needed during the butt welding process. As seen in FIG. 2, lap welding is preformed by overlapping a portion of one of the pieces with a portion of the other piece. In the illustrated configuration, the piece of magnesium alloy P2 overlaps the piece of aluminum alloy P1. The overlapped portions of the pieces P1, P2 are welded together using friction stir welding. That is, the overlying piece P2 is friction stir welded to the underlying piece P1.

The pieces P1, P2 can be welded together along a single joint line using conventional single-pass lap welding or can be welded together along two joint lines using conventional double-pass lap welding. When conventional double-pass lap welding is used, the pieces P1, P2 of materials are flipped over after they have been welded on one side and are then welded on the opposite side using the same process. When dissimilar metals (e.g., aluminum alloy and magnesium alloy) are lap welded together using friction stir welding, brittle intermetallic compounds (e.g., $Al_{12}Mg_{17}$, $Al_3Mg_2$) are often formed, which severely degrades the strength of the weld. As a result, prior efforts to lap pieces of dissimilar materials have been relatively unsuccessful.

BRIEF DESCRIPTION OF THE INVENTION

In one aspect, a process for friction stir welding pieces of dissimilar metals together generally comprises overlying a first piece of a second metal onto a first piece of a first metal that is dissimilar from the second metal such that at least a portion of the first piece of second metal overlaps a portion of the first piece of first metal. A second piece of the first metal is placed in side-to-side relationship with the first piece of second metal and overlying another portion of the first piece of first metal. The relative arrangement between the second piece of first metal and the first piece of second metal defines a joint line overlying the first piece of first metal. The first piece of first metal, the first piece of second metal, and the second piece of first metal are friction stir welded together along the joint line.

In another aspect, a process for friction stir welding pieces of dissimilar metals together generally comprises overlying a first piece of a second metal onto a first piece of a first metal that is dissimilar from the second metal such that at least a portion of the first piece of second metal overlaps a portion of the first piece of first metal. The first piece of second metal has a plurality of holes therein and the holes are disposed in overlapping relationship with the portion of the first piece of first metal. Each of the holes are filled with a plug formed from the first metal. The first piece of first metal is friction stir welded to the first piece of second metal at each of the plug locations.

In yet another aspect, a workpiece assembly generally comprises a first piece of a first metal and a first piece of a second metal overlying at least a portion of the first piece of first metal. A second piece of the first metal overlies the first piece of first metal and is in side-to-side relationship with the first piece of second metal. A weld seam securely joins the first piece of first metal, the first piece of second metal, and the second piece of first metal together. The weld seam is defined by a stirred mixture of the first metal and the second metal and extends between the first piece of second metal and the second piece of first metal.

In still another aspect, a workpiece assembly generally comprises a first piece of a first metal and a first piece of a second metal overlying at least a portion of the first piece of first metal. The first piece of second metal has a plurality of holes therein and each of the holes is filled with a plug formed from the first metal. A discontinuous weld seam securely joins the first piece of first metal and the first piece of second metal. The weld seam is defined by a plurality of weld spots comprising a stirred mixture of the first metal and the second metal. Each of the weld spots correspond to one of the plugs filling the holes in the first piece of second metal.

BRIEF DESCRIPTION OF THE DRAWINGS

This patent or patent application publication contains at least one drawing executed in color. Copies of this patent or patent application publication with color drawing(s) will be provided by the Office upon request and payment of the necessary fee.

FIG. 7 is a perspective illustrating a workpiece assembly formed using the double-pass lap welding process illustrated in FIGS. 6A and 6B.

FIG. 12 is a binary Al—Mg phase diagram.

FIG. 13 is a box diagram related to experiments conducted using various techniques of friction stir welding.

FIGS. 19A and 19B are color photographs of transverse cross-sections of welds CL-1 and CL-2 of FIG. 18, respectively.

FIGS. 24A and 24B are color photographs of transverse cross-sections of welds ML-3 and ML-1 of FIG. 22, respectively.

DETAILED DESCRIPTION OF THE DRAWINGS

Figure 1:
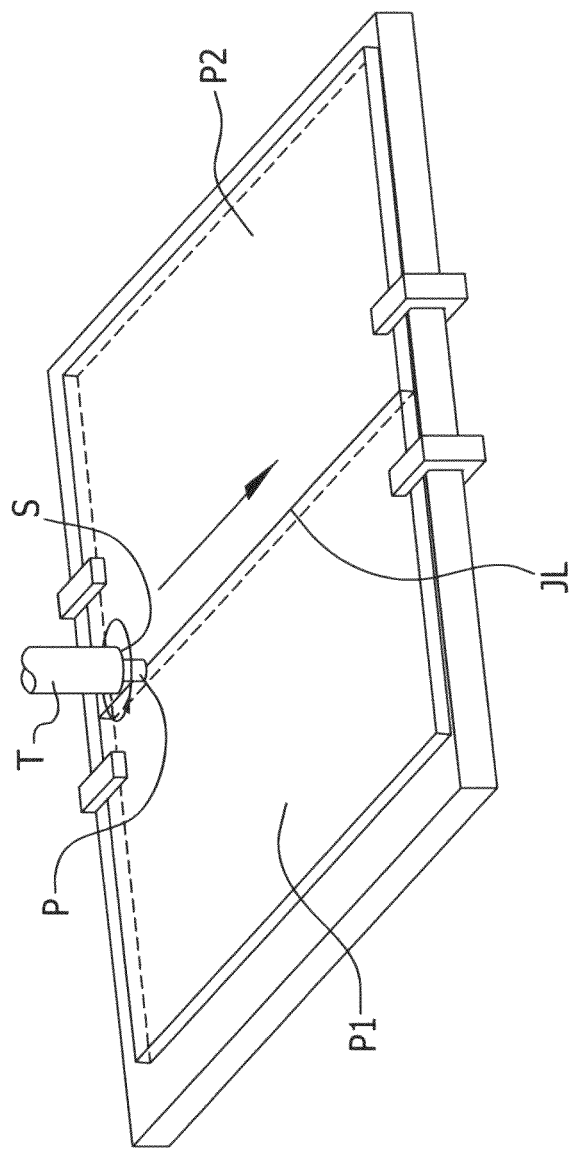
FIG. 1 is a perspective illustrating a conventional butt welding process using friction stir welding.
Figure 2:
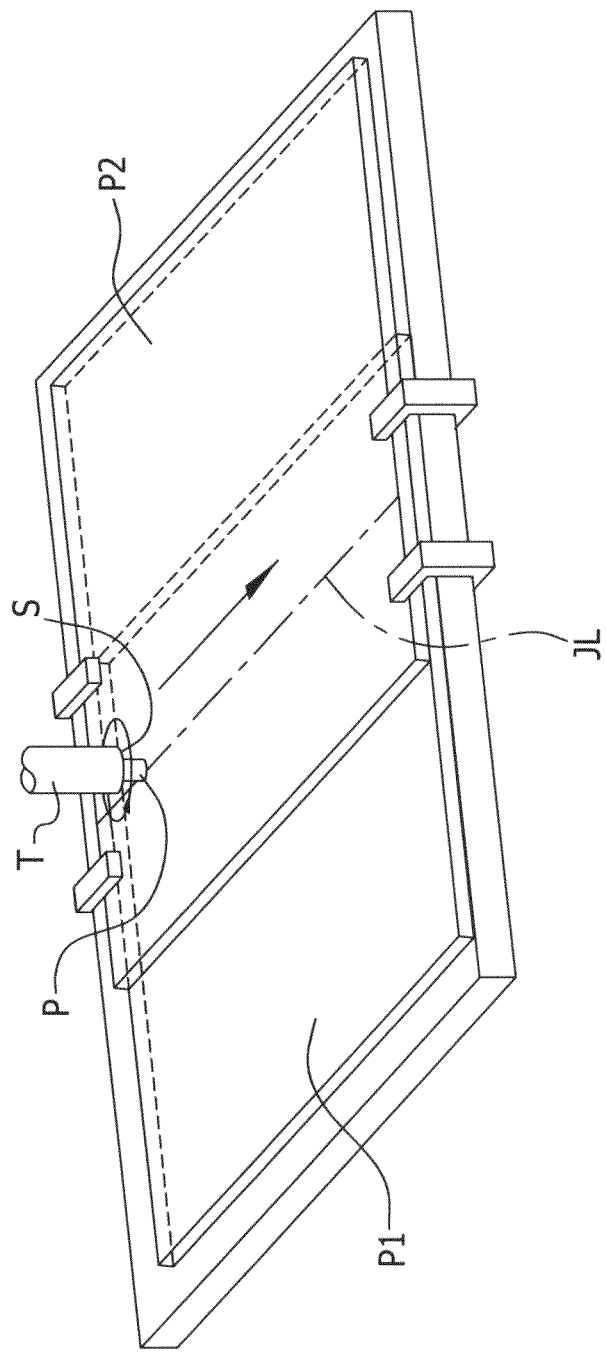
FIG. 2 is a perspective illustrating a conventional single-pass lap welding process using friction stir welding.
Figure 3:
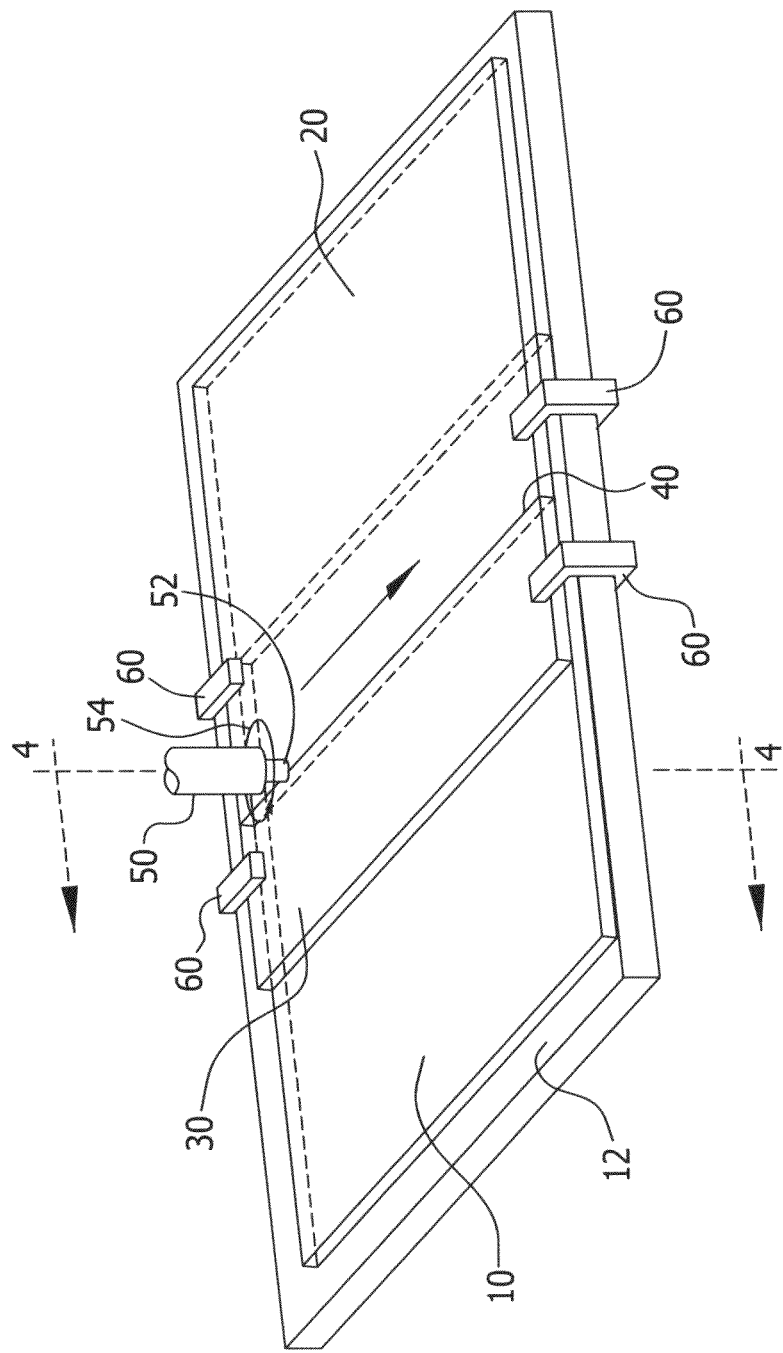
FIG. 3 is a perspective illustrating a modified single-pass lap welding process using friction stir welding.
Figure 4:
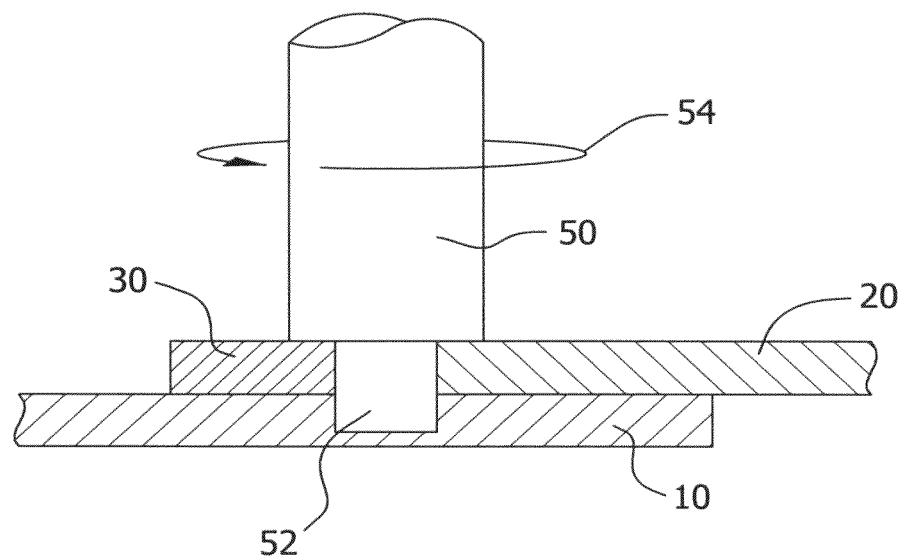
FIG. 4 is a cross-section taken along line 4-4 of FIG. 3.
Figure 5:
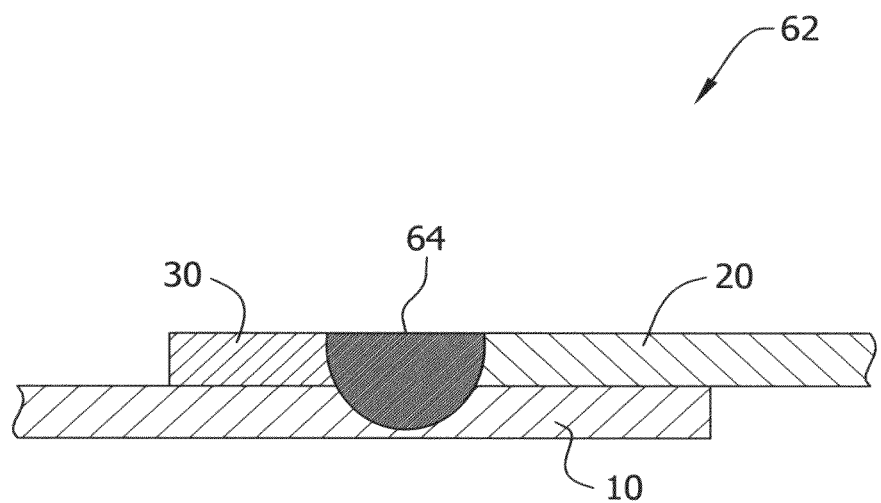
FIG. 5 is a cross-section similar to that of FIG. 4 but illustrating a workpiece assembly formed by the pieces being welded together using the process illustrated in FIGS. 3 and 4.

With reference now to the drawings, FIGS. 3-5 illustrated one embodiment of a process of friction stir welding workpieces of dissimilar metals together and the workpiece assembly resulting therefrom. In this embodiment, the pieces of dissimilar metals are welded together using a process referred herein as "modified single-pass lap welding", which is described below. It is understood that the pieces of dissimilar metals can be any suitable, dissimilar metals or alloys, e.g., aluminum and magnesium; aluminum and copper; aluminum and steel; aluminum and titanium, that are capable of being friction stir welded together. It is also understood that the pieces of dissimilar metals can be formed from different alloys of the same metal, e.g., 2000-series Al alloys can be welded to 6000-series Al alloys, 6000-series Al alloys can be welded to Al casting alloys.

As seen in the embodiment illustrated in FIG. 3, a first piece of a first metal (e.g., a first piece of magnesium alloy 10) is laid generally flat on a suitable support surface 12. A first piece of a second, dissimilar metal (e.g., a first piece of aluminum alloy 20) is overlaid on first piece of magnesium alloy 10. A second piece of the first metal (e.g., a second piece of magnesium alloy 30) is also overlaid on the first piece of magnesium alloy 10 and in side-to-side relationship with the first piece of aluminum alloy 20. As a result of the relative arrangement between the second piece of the magnesium alloy 30 and the first piece of aluminum alloy 20, a joint line 40 is formed between the two pieces. Each of the illustrated pieces 10, 20, 30 is a sheet of metal having substantially the same thickness as the other pieces. It is understood, however, that the pieces 10, 20, 30 can be formed from plates of metal, which are thicker than the illustrated sheets, or any other suitable metal. It is also understood that the pieces 10, 20, 30 can have different thicknesses as compared to each other. That is, one or two of the pieces may have a thickness that is different from the other pieces.

As seen in FIG. 3, the first pieces of magnesium alloy 10 and aluminum alloy 20 are generally rectangular in shape but can have different suitable shapes without departing from the scope of this invention. In the illustrated configuration, the first pieces of magnesium alloy 10 and aluminum alloy 20 have substantially the same shape but it is understood that the pieces can have different shapes. That is, the first piece of magnesium alloy 10 can have a shape that is different from the first piece of aluminum alloy 20. The illustrated second piece of magnesium alloy 30 is also rectangular but has a width that is substantially less than the widths of the first piece of magnesium alloy 10 and the first piece of aluminum alloy 20. The length of the second piece of magnesium alloy 30 is substantially the same as the lengths of the first piece of magnesium alloy 10 and the first piece of aluminum alloy 20. It is contemplated that the length and width of the second piece of magnesium alloy 30 can be different than that illustrated in FIG. 3. For example, the second piece of magnesium alloy 30 can have a length that is less than the lengths of the first piece of magnesium alloy 10 and/or the first piece of aluminum alloy 20.

As seen in FIG. 3, the three pieces 10, 20, 30 can be friction stir welded together along the joint line 40. In one suitable embodiment, a conventional milling machine (not shown) can be equipped with a tool 50 having a pin 52 extending downward therefrom. The tool 50 and pin 52 can be rotated either counterclockwise, as indicated by arrow 54 in FIG. 3, or clockwise and moved transversely along the joint line 40, as indicated by arrow 56 in FIG. 3. In the illustrated embodiment, the tool 50 and pin 52 are aligned along the joint line 40 but it is understood that the tool and pin can be offset slightly from the joint line. The tool 50 and pin 52 can be offset toward either the second piece of magnesium alloy 30 or the first piece of aluminum alloy 20. Suitably, the amount of offset is equal to or less than the diameter of the pin 52.

In one suitable embodiment, the pin 52 is tilted forward in the direction of movement of the tool 50 between about 2 degrees and about 4 degrees. More suitably, the pin 52 is tilted forward about 3 degrees. A plurality of clamps 60 can be used to secure the pieces 10, 20, 30 during the welding process. It is contemplated that other means for securing the pieces 10, 20, 30 during the welding process can be used besides the illustrated clamps 60 and that more or fewer clamps can be used.

During the welding process, the tool 50 and thereby the pin 52 is moved along the joint line 40 to weld the three pieces 10, 20, 30 together to form a workpiece assembly, indicated generally at 62 in FIG. 5. A length of the pin 52 is predetermined such that it extends through the second piece of magnesium alloy 30 and first piece of aluminum alloy 20, and into but not completely through the first piece of magnesium alloy 10 as illustrated in FIG. 4.

As discussed above, the tool 50 and the pin 52 generate a sufficient amount of heat during the welding process to plasticize portions of the pieces 10, 20, 30 adjacent the joint line 40 as they are moved along the joint line. The pin 52 mixes the plasticized material together to form a weld seam 64 (FIG. 5). In the embodiment illustrated in FIGS. 3 and 4, the plasticized material is mixed (or stirred) by the pin 52 in a counterclockwise direction. As a result, plasticized material from the first and second pieces of magnesium alloy 10, 30, which is on what is referred to as the advancing side, is moved toward and mixed with plasticized material of the first piece of the aluminum alloy 20, which is on what is referred to as the retreating side. Plasticized material from the first piece of aluminum alloy 20 is also moved toward and mixed with plasticized material from the first and second pieces of magnesium alloy 10, 30. The plasticized materials of the pieces 10, 20, 30 are allowed to cool and form the weld seam 64, which securely joins the three pieces together to define the workpiece assembly 62.

With reference now to FIG. 5, the above-described process results in the workpiece assembly 62 comprising the first and second pieces of magnesium alloy 10, 30 and the first piece of aluminum alloy 20 being welded together by weld seam 64. The weld seam 64 is defined by a stirred mixture of magnesium and aluminum alloys.

With reference now to FIGS. 6A-8, another suitable process of friction stir welding pieces of dissimilar metals together and the resulting workpiece assembly are illustrated therein. In this embodiment, the pieces of dissimilar metals are welded together using a process referred to herein as "modified dual-pass lap welding", which is described below. In the illustrated embodiment, a first piece of a first metal (e.g., a first piece of magnesium alloy 110) is laid generally flat on a suitable support surface 112. A first piece of a second, dissimilar metal (e.g., a first piece of aluminum alloy 120) is overlaid on the first piece of magnesium alloy 110. A second piece of the first metal (e.g., a second piece of magnesium alloy 130) is also overlaid on the first piece of magnesium alloy 110 and in side-to-side relationship with the first piece of aluminum alloy 120. As a result of the relative arrangement between the second piece of magnesium alloy 130 and the first piece of aluminum alloy 120, a joint line 140 is formed between the two pieces.

Figure 6A:
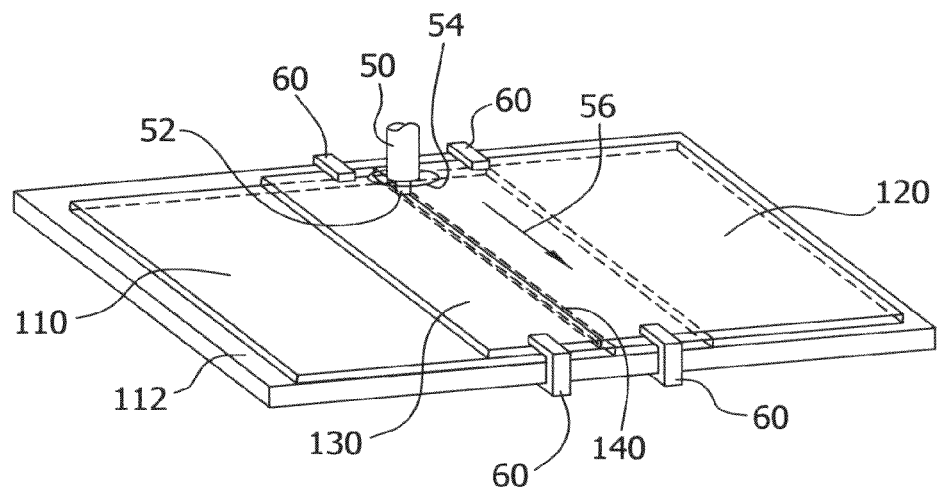
FIGS. 6A and 6B are perspectives illustrating a modified double-pass lap welding process using friction stir welding.

As seen in FIG. 6A, the three pieces 110, 120, 130 can be friction stir welded together along the joint line 140 using the tool 50 and the pin 52 extending downward from the tool in the same manner describe above with respect to FIGS. 3-5. That is, the tool 50 and pin 52 can be rotated either counterclockwise, as indicated by arrow 54 in FIG. 6A, or clockwise and moved transversely along the joint line 140, as indicated by arrow 56 in FIG. 6A. In the illustrated embodiment, the tool 50 and pin 52 are aligned for movement along the joint line 140 but it is understood that the tool and pin can be offset slightly from the joint line. The tool 50 and pin 52 can be offset toward either the second piece of magnesium alloy 130 or the first piece of aluminum alloy 120.

In one suitable embodiment, the pin 52 is tilted forward in the direction of movement of the tool between about 2 degrees and about 4 degrees, and more suitable, the pin 52 is tilted forward about 3 degrees. As in the previous process, the plurality of clamps 60 can be used to secure the pieces 110, 120, 130 during the welding process.

Figure 6B:
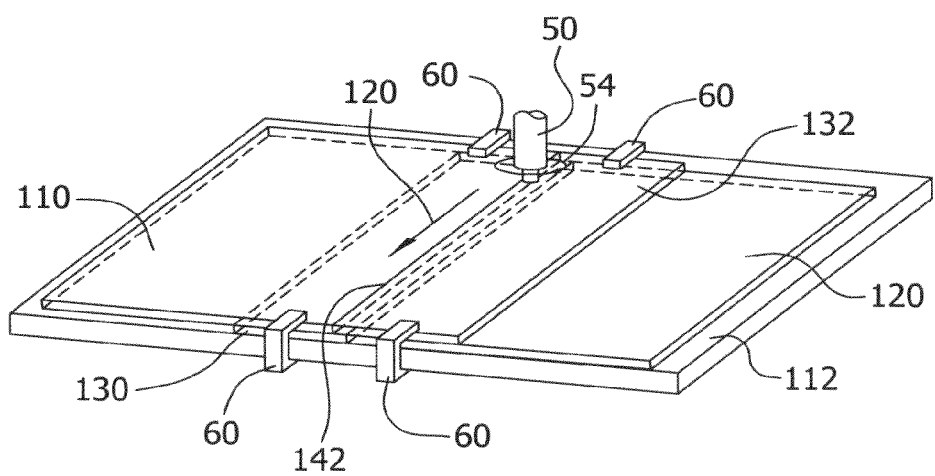

During the welding process, the tool 50 and thereby the pin 52 is moved along the joint line 140 to weld the three pieces 110, 120, 130 together. After the three pieces 110, 120, 130 are welded together along joint line 140, the flash is removed. Then, the pieces are flipped over such that the first piece of magnesium alloy 110 overlies the first piece of aluminum alloy 120 (FIG. 6B). A second piece aluminum alloy 132 is overlaid on the first piece of the aluminum alloy 120 and in side-to-side relationship with the first piece of magnesium alloy 110. As a result of the relative arrangement between the second piece of the aluminum alloy 120 and the first piece of magnesium alloy 110, a joint line 142 (broadly, "a second joint line") is formed between the two pieces. As seen in FIG. 6B, the three pieces 110, 120, 132 can be friction stir welded together along the joint line 142 using the tool 50 and pin 52. The tool 50 and the pin 52 are moved along the joint line 142 or slightly offset from the joint line to weld the three pieces 110, 120, 132 together.

Figure 8:
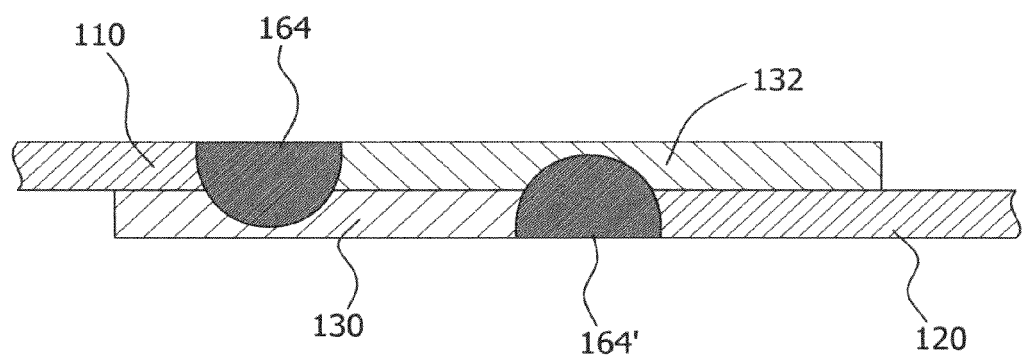
FIG. 8 is a cross-section taken along line 8-8 of FIG. 7.

With reference now to FIGS. 7 and 8, the above-described process results in the workpiece assembly 162 comprising the first and second pieces of magnesium alloy 110, 130 and the first and second pieces of aluminum alloy 120, 132 being welded together by weld seams 164, 164'. The weld seams 164, 164' are defined by a stirred mixture of magnesium and aluminum alloys.

FIGS. 9A-11 illustrate yet another process of friction stir welding pieces of dissimilar metals together to form a workpiece assembly 262. In this embodiment, the pieces of dissimilar metals are welded together using a process referred to herein as "modified spot friction stir welding", which is described below. In the illustrated embodiment, a first piece of a first metal (e.g., a first piece of magnesium alloy 210) is laid generally flat on a suitable support surface 212. A first piece of a second, dissimilar metal (e.g., a first piece of aluminum alloy 220) is overlaid on the first piece of magnesium alloy 210.

Figure 9A:
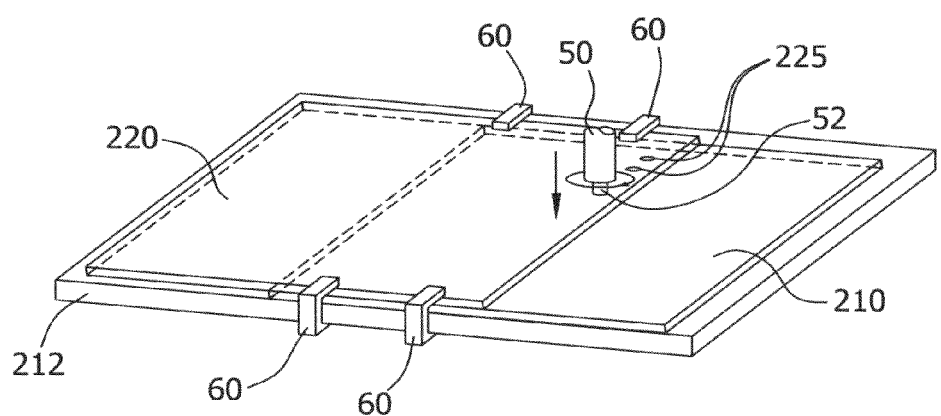
FIGS. 9A-9D are perspectives illustrating a modified lap welding process using spot friction stir welding.
Figure 9B:
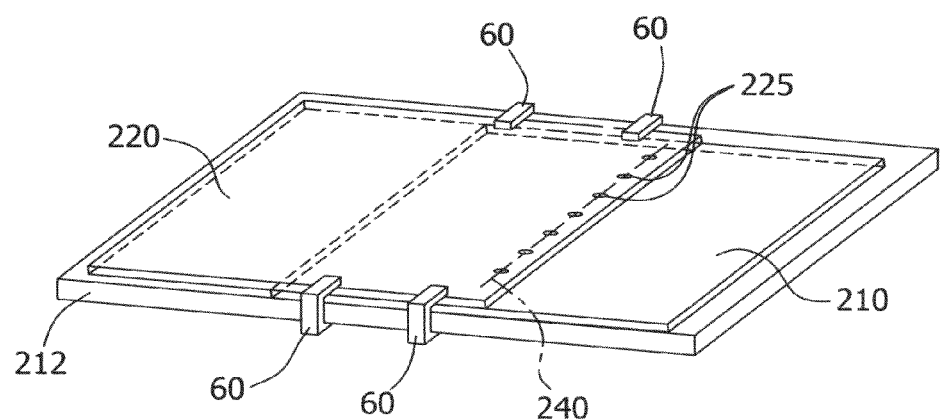

As illustrated in FIG. 9A, the tool 52 is used to drill a plurality of holes 225 into the first piece of aluminum alloy 220. In the illustrated embodiment, the holes 225 are generally circular and are spaced from each other along a transverse joint line 240 (FIG. 9B). It is contemplated that all or some of the holes can have different sizes, be other than circular, and arranged in any suitable configuration. It is also contemplated that the holes 225 can be drilled using a different tool or formed by a different means than drilling (e.g., stamping). It is further contemplated that the holes 225 may extend into but not through the first piece of magnesium alloy 220 thereby creating recesses in the first piece of magnesium alloy that correspond to each of the holes. Moreover, the holes 225 may be formed in the first piece of aluminum alloy 220 before it is overlaid on the first piece of magnesium alloy 210.

Figure 9C:
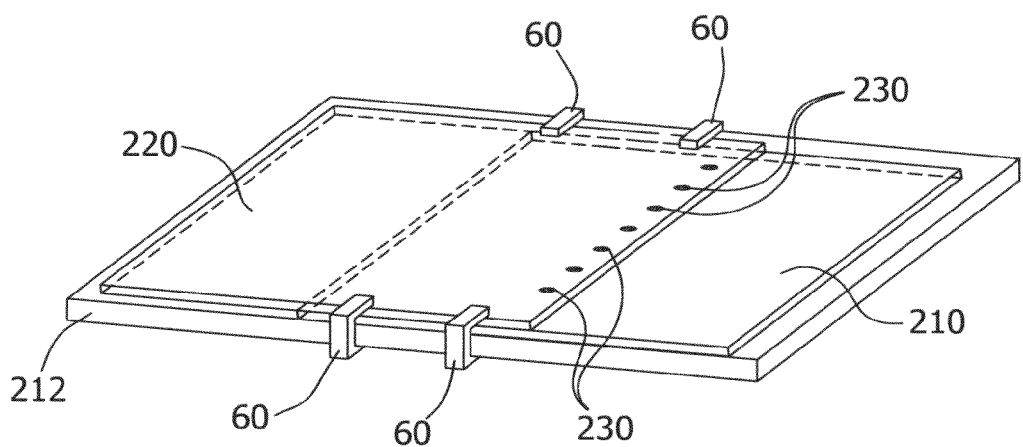
Figure 9D:
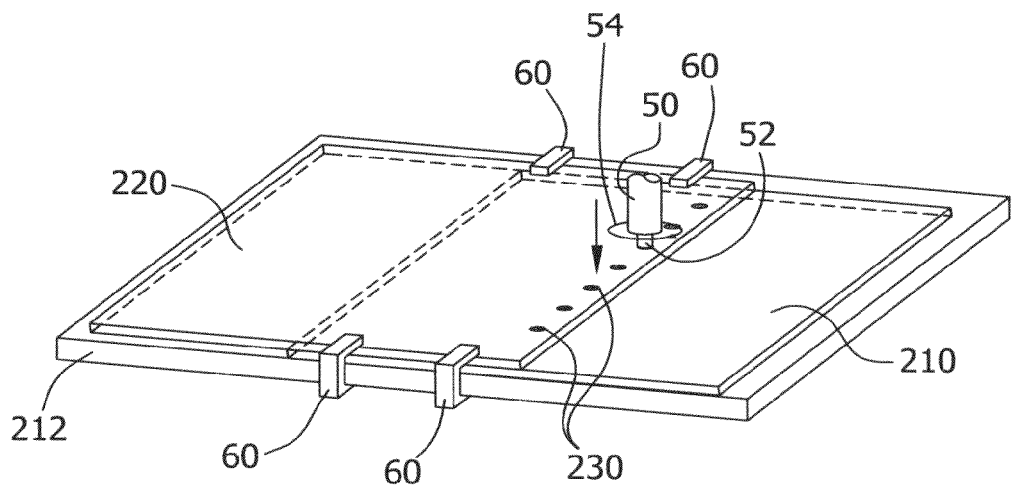

With reference now to FIG. 9C, a plug 230 of magnesium alloy is placed in each of the holes 225. Each of the illustrated plugs 230 are sized and shaped to substantially fill one of the holes 225. In one suitable embodiment, the plugs 230 have a height that is substantially the same as the depth of the holes 225 so that an upper surface of each of the plugs 230 is generally coplanar with an upper surface of the first piece of aluminum alloy 220 when the plugs are placed in the holes. Suitably, each of the plugs 230 has a diameter that is slightly less than the diameter of each of the holes 225 to facilitate insertion of the plugs into the holes. In one suitable embodiment, each of the plugs 230 has a diameter that is between about 100 micrometers and about 400 micrometers smaller than the diameter of the holes 225, more suitably about 200 micrometers to about 300 micrometers smaller, and more suitably about 250 micrometers smaller than the diameter of the holes 225. It is understood, however, that the plugs 230 and holes 225 can have different relative diameters without departing from the scope of this invention.

The tool 50 and pin 52 are used to spot friction stir weld together the plugs 230, the first piece of magnesium alloy 210, and the first piece of aluminum alloy 220. The tool 50 and pin 52 can be rotated either counterclockwise, as indicated by arrow 54 in FIG. 9D, or clockwise. The tool 50 and pin 52 are aligned with the center of one of the plugs 230 and lowered so that the pin extends into the magnesium plug 230 and spot weld the first piece of aluminum alloy 220 to the first piece of magnesium alloy. This process is repeated for all of the plugs 230 to form spot welds 264 between the first piece of magnesium alloy 210 and the first piece of aluminum alloy 220 are formed at each location as illustrated in FIG. 10.

In another suitable embodiment, each of the plugs 230 has a diameter that is 50 to 100 percent larger than the diameter of the pin 52. Thus, if the pin 52 has a diameter of about 4 mm then each of the plugs would suitably have a diameter between about 6 mm and about 8 mm. It is understood that the pin 52 and plugs 230 can have other diameters without departing from the scope of this invention.

A plurality of clamps 60 can be used to secure the pieces 210, 220 in place during the welding process. It is contemplated that other means for securing the pieces 210, 220 during the welding process can be used besides the illustrated clamps 60 and that more or fewer clamps can be used.

Figure 10:
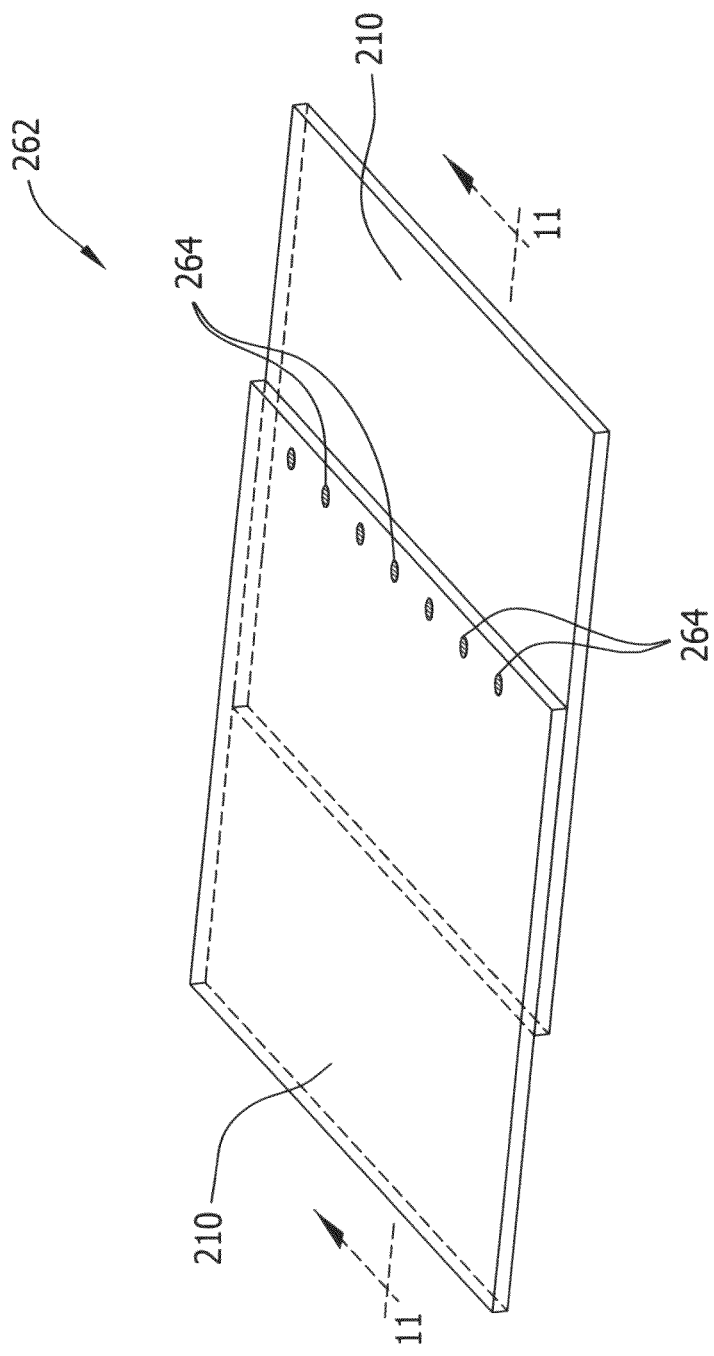
FIG. 10 is a perspective illustrating a workpiece assembly formed using the lap welding process illustrated in FIGS. 9A-9D.
Figure 11:
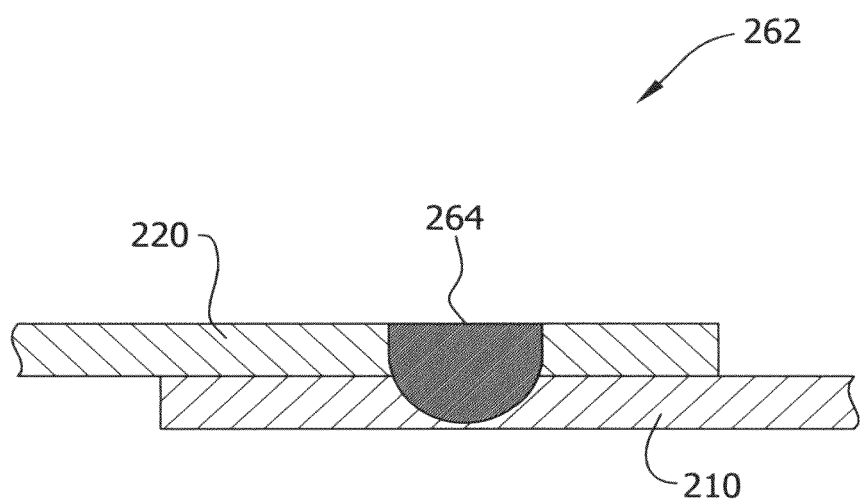
FIG. 11 is a cross-section taken along line 11-11 of FIG. 10.

As illustrated in FIGS. 10 and 11, a workpiece assembly, indicated generally at 262, comprising the first piece of magnesium alloy 210 and the first piece of aluminum alloy 220 being welded together along the weld seam 264. The weld seam 264 is discontinuous and defined by discrete spots of a stirred mixture of magnesium and aluminum alloys.

Experiment

In one experiment, pieces of an aluminum alloy (6061 Al) were welded to pieces of a magnesium alloy (AZ31B Mg) using different welding techniques including conventional butt welding, conventional single-pass lap welding, conventional dual-pass lap welding, the modified single-pass friction stir welding process described above and illustrated in FIGS. 3 and 4, and the modified double-pass friction stir welding process described above and illustrated in FIGS. 6A-8. Two references (or standards) were also formed using the same welding techniques used to weld together the pieces of 6061 Al and AZ31B Mg. One of the references was formed by welding a piece of AZ31B Mg to another piece of AZ31B Mg and the other reference was formed by welding a piece of 6061 Al to another piece of 6061 Al. Each of the pieces used in the experiment was cut from 1.6 millimeter thick sheets of either AZ31 Mg alloy or 6061-T6 Al alloy and cleaned with a stainless steel brush to remove any surface oxides or other debris therefrom. The nominal chemical compositions of 6061 Al and AZ31B Mg are provided below in Table 1.

TABLE 1

| | Composition of workpiece materials (percent by weight) | | | | | | | | |
|---|---|---|---|---|---|---|---|---|---|
| | Si | Cu | Mn | Mg | Cr | Zn | Ti | Fe | Al |
| 6061 Al | 0.62 | 0.28 | 0.08 | 0.89 | 0.19 | 0.02 | 0.01 | 0.52 | 97.39 |
| AZ31B Mg | — | — | 0.5 | 95.5 | — | 1.0 | — | — | 3.0 |

A 2.2 kW (3 HP) Lagun FTV-1 milling machine equipped with a H13 steel tool was used to friction stir weld the pieces of material together. The tool had a concave shoulder with a 10 mm diameter. A 4 mm diameter threaded pin depended from the tool. For butt welding, the pin length was 1.3 mm and, for lap welding (both conventional and modified) the pin length was 1.5 mm. Additional conventional lap welding was also conducted with using a pin having a length of 2.3 mm.

During the friction stir welding process, the tool was rotated counterclockwise, and tilted forward (i.e., in the direction of movement of the tool) 3 degrees. Each of the pieces was clamped down tight using two, opposing steel fingers located about 10 mm away from the weld line. The tool and pin were cleaned after each welding pass by plunging it into a fresh piece of 6061 Al. This removed any material potentially stuck on the tool and/or pin from the previous weld. Two different rotation speeds 1,400 rpm and 800 rpm were initially used. Besides one exception, the joint strength was significantly lower when the rotation speed was set at 800 rpm. As a result, the rotation speed was fixed at 1,400 rpm after several welds were made at 800 rpm. The travel speed (i.e., the speed at which the tool and thereby the pin is moved along the weld line) was set at 38 mm/minute Conventional Butt Welding Eleven conventional butt welds were made during this experiment and the weld conditions and results are listed in Table 2. As seen in Table 2, the conventional butt welds formed between two pieces of 6061 Al or two pieces of AZ31 Mg were relatively strong (e.g., over 2,000 Newtons). The other nine conventional butt welds were made to weld AZ31 Mg to 6061 Al. AZ31 Mg was either on the advancing or retreating side of the tool. The tool axis was positioned along the joint (no offset) or shifted 1.5 mm (1.5 mm offset) toward either 6061 Al or AZ31 Mg. Three of the nine welds were relatively weak, three were relatively strong and the other three were moderate. Thus, the strength of butt welds joining the pieces of 6061 Al and AZ31 Mg was inconsistent and therefore unpredictable.

TABLE 2

| | | Conventional Butt welds | | | | | |
|---|---|---|---|---|---|---|---|
| # | Joint | Rotation Speed (rpm) | Travel Speed (mm/min) | Pin Length (mm) | Tool offset (mm) | Tensile Load (N) | Standard Deviation (+/−N) |
| B-1 | Al to Al | 1400 | 38 | 1.3 | 0 | 3109 | 19 |
| B-2 | Mg to Mg | 1400 | 38 | 1.3 | 0 | 2580 | 102 |
| B-3 | Mg (ret) to Al (adv) | 1400 | 38 | 1.3 | 0 | 1318 | 249 |
| B-4 | Al (ret) to Mg (adv) | 800 | 38 | 1.3 | 0 | 1337 | 247 |
| B-5 | Al (ret) to Mg (adv) | 1400 | 38 | 1.3 | 0 | 2055 | 274 |
| B-6 | Al (ret) to Mg (adv) | 800 | 38 | 1.3 | 1.5 into Mg | 2590 | 73 |
| B-7 | Al (ret) to Mg (adv) | 1400 | 38 | 1.3 | 1.5 into Mg | 2109 | 217 |
| B-8 | Al (adv) to Mg (ret) | 1400 | 38 | 1.3 | 1.5 into Mg | <400 | — |
| B-9 | Al (ret) to Mg (adv) | 800 | 38 | 1.3 | 1.5 into Al | <400 | — |
| B-10 | Al (ret) to Mg (adv) | 1400 | 38 | 1.3 | 1.5 into Al | 1589 | — |
| B-11 | Mg (ret) to Al (adv) | 1400 | 38 | 1.3 | 1.5 into Al | <400 | — |

Conventional Single-Pass Lap Welding

Six conventional single-pass lap welds were made during this experiment and the conditions and results are listed in Table 3. Each of the lap welds were was positioned along a centerline of a 38 mm overlap. That is, the overlap between the welded pieces was 38 mm and the weld was made along the centerline of the overlap (i.e., 19 mm from either edge of the overlap).

As seen in Table 3, the conventional lap welds formed between two pieces of 6061 Al or two pieces of AZ31 Mg were relatively strong (e.g., over 2,000 Newtons). The other four conventional lap welds were used to weld AZ31 Mg to 6061 Al. Three of the four welds were relatively weak while one was moderate. Thus, the overall strength of butt welds joining the pieces of 6061 Al and AZ31 Mg was relatively low, inconsistent, and unpredictable.

TABLE 3

| | | Conventional lap welds (single pass) | | | | |
|---|---|---|---|---|---|---|
| # | Joint | Rotation Speed (rpm) | Travel Speed (mm/min) | Pin Length (mm) | Tensile Load (N) | Standard Deviation (+/−N) |
| CL-5 | Al to Al | 1400 | 38 | 1.5 | 3356 | 54 |
| CL-6 | Mg to Mg | 1400 | 38 | 1.5 | 2463 | 190 |
| CL-1 | Al (top) to Mg (bottom) | 1400 | 38 | 1.5 | 862 | 25 |
| CL-2 | Mg (top) to Al (bottom) | 1400 | 38 | 1.5 | 1077 | 6 |
| CL-3 | Al (top) to Mg (bottom) | 1400 | 38 | 2.3 | 554 | 5 |
| CL-4 | Mg (top) to Al (bottom) | 1400 | 38 | 2.3 | 978 | 90 |

Conventional Dual-Pass Lap Welding

One conventional dual-pass lap welding was formed to determine how much the joint strength could be increased by making a second pass. The welding conditions of the dual-pass lap welding are listed in Table 4. The strength of the weld was more than double that of the single pass weld (see CL-2 and CL-4).

TABLE 4

Conventional lap welds (dual pass)

| # | Joint | Rotation Speed (rpm) | Travel Speed (mm/min) | Pin Length (mm) | Tensile Load (N) | Standard Deviation (+/−N) |
|---|---|---|---|---|---|---|
| CL-7 | Top: Mg and 1st pass; Bottom: Al and 2nd pass | 1400 | 38 | 1.5 | 2269 | 31 |

Modified Single-Pass Lap Welding

The welding conditions of the single-pass modified friction stir welding are provided in Table 5. A small piece of the bottom-sheet material, 76 mm long, 19 mm wide, and 1.6 mm thick, was butt welded to the top sheet with pin penetration into the bottom sheet. The 19 mm width of the small piece was mainly for the space required for clamping. If the clamps permitted, the width of the small piece could have been less. When AZ31 Mg was on the top, whether it was the top sheet or the small piece, was placed on the advancing side of the tool. This was because, as will be shown subsequently, butt welds were significantly weaker with 6061 Al on the advancing side.

TABLE 5

Modified lap welds (single-pass)

| # | Joint | Rotation Speed (rpm) | Travel Speed (mm/min) | Pin Length (mm) | Tool offset at top (mm) | Tensile Load (N) | Standard Deviation (+/−N) |
|---|---|---|---|---|---|---|---|
| ML-5 | Top: Al (ret) and small Mg (adv); Bottom: Mg | 800 | 38 | 1.5 | 1.5 into small Mg | 1808 | 8 |
| ML-1 | Top: Al (ret) and small Mg (adv); Bottom: Mg | 1400 | 38 | 1.5 | 1.5 into small Mg | 2711 | 235 |
| ML-2 | Top: Mg (adv) and small Al (ret); Bottom: Al | 1400 | 38 | 1.5 | 1.5 into small Al | 1434 | 14 |
| ML-3 | Top: Mg (adv) and small Al (ret); Bottom: Al | 1400 | 38 | 1.5 | 0 | 993 | 98 |
| ML-4 | Top: Al (ret) and small Mg (adv); Bottom: Mg | 1400 | 38 | 1.5 | 0 | 1797 | 136 |

Modified Dual-Pass Lap Welding

Modified dual-pass friction stir welding was similar in material positions except a second pass was made from the opposite side, with its centerline 10 mm away from that of the first pass. The welding conditions of the modified dual-pass lap welds are listed in Table 6.

TABLE 6

Modified lap welds (dual pass)

| # | Joint | Rotation Speed (rpm) | Travel Speed (mm/min) | Pin Length (mm) | Tool offset (mm) | Tensile Load (N) | Standard Deviation (+/−N) |
|---|---|---|---|---|---|---|---|
| ML-6 | Top: Al (ret) and small Mg (adv); | 1400 | 38 | 1.5 | 1.5 into small Mg | 4530 | 87 |

TABLE 6-continued

Modified lap welds (dual pass)

| # | Joint | Rotation Speed (rpm) | Travel Speed (mm/min) | Pin Length (mm) | Tool offset (mm) | Tensile Load (N) | Standard Deviation (+/−N) |
|---|---|---|---|---|---|---|---|
|  | Bottom: Mg (adv) and small Al (ret) |  |  |  | and small Al |  |  |
| ML-7 | Top: Al (ret) and small Mg (adv); Bottom: Mg (adv) and small Al (ret) | 1400 | 38 | 1.5 | 0 | 3559 | 116 |

Tensile Testing

The joint strength, which is provided in the above tables, was determined by tensile testing normal to the weld. Welded coupons were cut in the direction normal to the weld into to 12 mm-wide tensile specimens. The edges of the tensile specimens were polished smooth with 320-grit grinding paper. For lap welds, a 1.6 mm-thick sheet was placed at each end of the tensile specimen to initially align the specimen with the loading direction. A Sintech tensile testing machine was used, and the speed of the crosshead movement was 1 mm/min. Two to four specimens from welds made under the same condition were tested.

Temperature Measurements

A computer-based data acquisition system was used along with K-type thermocouples for temperature measurements at 100 Hz during the friction stir welding process of each of the samples. The thermocouple, with a stainless steel sheath of 0.5 mm outer diameter, was placed in a 0.5 mm×0.5 mm groove at the workpiece surface that ended 3 mm away from the path of the tool axis. In both conventional and modified lap friction stir welding the grooves were at the top surface of the lower sheet. In butt friction stir welding, on the other hand, they were at the bottom surface of the workpiece.

Weld Microstructure

Transverse weld cross-sections were prepared by polishing and etching in three steps. The first step was to etch the samples with a solution consisting of 10 ml acetic acid, 10 ml distilled water and 6-gram picric acid in 100 ml ethanol for 10 s (to reveal the AZ31 part of the microstructure). The second step was to etch them with a solution consisting of 20-gram NaOH in 100 ml distilled water for 40 s (to reveal the grain structure in 6061 Al). The final step was to dip them in a solution consisting of 4-gram $KMnO_4$ and 2-gram NaOH in 100 ml distilled water for 10 s (to make Al colorful). The 3-step etching procedure showed Al, Mg, $Al_3Mg_2$ and $Al_{12}Mg_{17}$ all in different colors.

A JEOL JSM-6100 scanning electron microscope with energy dispersive spectroscopy (EDS) was used for chemical composition measurements. A Hi-Star 2-D x-ray diffractometer with an area detector was used to identify the intermetallic compounds.

Al—Mg Phase Diagram

A binary Al—Mg phase diagram is shown in FIG. 12 wherein there are two eutectics. The first one is between the Al-rich phase (Al) and $Al_3Mg_2$, which is essentially $Al_3Mg_2$, and the second is between the Mg-rich phase (Mg) and $Al_{12}Mg_{17}$. Both eutectic temperatures, 450° C. for the former and 437° C. for the latter, are far below the melting points of Al (660° C.) and Mg (650° C.). According to the Al—Mg phase diagram shown in FIG. 12, when Al and Mg are heated up together such as during friction stir welding, intermetallic compounds $Al_3Mg_2$ and $Al_{12}Mg_{17}$ can form, the former on the Al side and the latter on the Mg side. Upon further heating, the eutectic reaction $Mg+Al_{12}Mg_{17}$ occurs at the eutectic temperature 437° C., which causes liquid to form. The eutectic reaction $Al+Al_3Mg_2$ occurs at the eutectic temperature 450° C. and also causes liquid to form. This liquid is referred to as constitutional liquation. At the room temperature, $Al_3Mg_2$ contains about 37 wt % Mg and $Al_{12}Mg_{17}$ about 57 wt % Mg. The eutectic temperatures 437° C. and 450° C. are more than 200° C. below the melting point of either Al or Mg, and they can be reached easily during Al-to-Mg friction stir welding to form liquid films along the interface between Al and Mg. Upon cooling, the two eutectic reactions are reversed, and $Al_3Mg_2$ and $Al_{12}Mg_{17}$ are formed from the liquid.

Heat Input in Friction Stir Welding

Liquation in the weld during friction stir welding increases when the heat input is increased. The increase in liquation may result in more liquid films forming along grain boundaries and, in the case of Al-to-Mg friction stir welding, the Al/Mg interface. Since the liquid films weaken the Al/Mg interface under shearing force caused by the tool, cracking may occur along the interface.

FIG. 13 shows two hypotheses made based on two facts regarding the heat input observed in friction stir welding. With respect to fact 1, in similar-metal butt friction stir welding more heating occurs on the advancing side than the retreating side. Both computer simulations and temperature measurements have shown higher peak temperatures on the advancing side. As mentioned previously, the advancing side is the side where material is pushed forward by the rotating tool, while the retreating side is the side where material is pushed backward. On the advancing side, the tool rotates in the opposite direction of workpiece flow while on the retreating side it rotates in the same direction. Consequently, the material on the advancing side tends to experience greater shearing and heating than that on the retreating side.

For a lower conductivity material such as 304 stainless steel, the temperature on the advancing side can be as much as 100° C. higher than that on the retreating side. For a higher conductivity material such as an Al or Mg alloy, the difference is often smaller. However, the liquation (eutectic) temperatures are rather low (437° C. and 450° C.). Furthermore, a relatively small temperature increase can significantly increase the fraction of liquid, that is, the extent of liquation. For instance, according to the Al—Mg phase diagram (FIG. 12) a material with 60 wt % Mg and 40 wt % Al has a melting temperature range of only about 10° C. Thus, this material begins to liquate at the eutectic temperature 437° C. and melts completely at about 447° C.

In similar-metal butt friction stir welding, more heating occurs in 6xxx Al alloys than in AZ (Mg—Al—Zn) or AM (Mg—Al—Mn) Mg alloys. In similar-metal butt friction stir welding, higher peak temperatures (100° C. higher on the advancing side and 80° C. on the retreating side, both at 10 mm from the joint line) have been observed in 6040 Al than in AZ31 Mg. Similar trends have been observed in studies on similar-metal friction stir spot welding where heat is generated by a rotating but stationary tool. The stir zone at the tool shoulder has been observed to have a higher peak temperature (about 80° C. higher) in 6111 Al than in AZ91 Mg. A higher torque and heat input (almost three times higher heat input) have been observed in 6061 Al than in AM60 Mg. A higher torque and heat input (twice higher heat input) have been observed in 6061 Al than in AZ91 Mg.

With respect to fact 2, it has been observed in similar-metal friction stir spot welding that AZ and AM Mg can liquate much more easily than 6xxx Al. In AZ and AM Mg (and most other Mg alloys because Al is the most widely used alloying element in Mg alloys) $Al_{12}Mg_{17}$ is present to react with the surrounding Mg-rich matrix to form liquid at 437° C. (FIG. 12). The liquid films at interface between the tool and the stir zone can cause tool slippage, while those along grain boundaries within the stir zone can decrease its resistance to tool rotation. Consequently, the torque and the work it does, which contributes to nearly all of the heat input, are significantly lower in welding AZ and AM Mg than 6xxx Al. Second, with its face-centered cubic structure, Al has more slip planes available for deformation than Mg, which is hexagonal close-packed (hcp) in structure. Thus, as compared to Mg, Al is more deformable. It has been noted in similar-metal butt friction stir welding that the stir zone was twice bigger in cross-section in 6040 Al than in AZ31 Mg, which perhaps suggest more heating by viscous dissipation in the former.

Based on the two facts, two hypotheses can be made regarding dissimilar-metal friction stir welding of 6xxx Al to AZ or AM Mg with the same tool at the same rotation speed and travel speed. Hypothesis 1 is that a higher heat input can be expected in butt friction stir welding with Al on the advancing side. Hypothesis 2 is that a higher heat input can be expected with a larger Al/tool contact area. A larger Al/tool contact area can exist in the following two cases: first, with tool offset to Al in butt friction stir welding and, second, with Al on the top in lap friction stir welding. Regarding the first case, the difference can be expected to be more significant with Al on the advancing side in view of Hypothesis 1.

These hypotheses will be used below to explain the effect of material positions on the heat input in Al-to-Mg friction stir welding of this experiment.

Butt Welding

Figure 14:
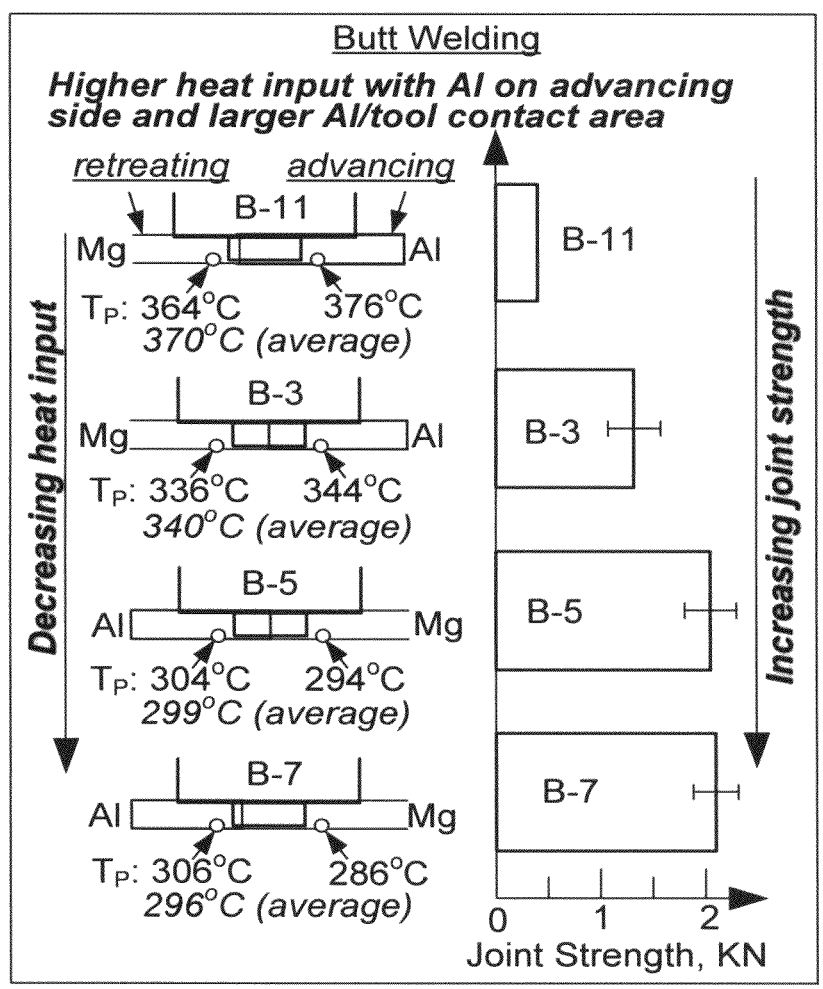
FIG. 14 is a diagram illustrating the effect of material positions on the joint strength in butt friction stir welding of an aluminum alloy and a magnesium alloy.

The effect of material positions on the joint strength in butt friction stir welding is shown in FIG. 14. First, material positions have a significant effect on the joint strength. The difference can be as high as a factor of about two to three. Second, the joint strength is higher with AZ31 Mg on the advancing side. Third, increasing tool offset to AZ31 Mg improves the joint strength.

Based on the two hypotheses mentioned previously, with the same tool at the same rotation speed and travel speed, the effect of material positions on the heat input in Al-to-Mg butt friction stir welding can be predicted as shown by the arrow indicating the direction of decreasing heat input in FIG. 14. First, the heat input can be higher in butt friction stir welding with Al on the advancing side (welds B-11 and B-3) than with Al on the retreating side (welds B-5 and B-7). Second, with Al on the advancing side the heat input can be higher with tool offset to Al (weld B-11) than without any offset (weld B-3). Third, the heat input can be lower with tool offset to Mg (weld B-7) than without any offset (weld B-5), but the difference is likely to be smaller because Al is on the retreating side.

As shown in FIG. 14, the measured peak temperatures are in agreement with the prediction. The thermocouples were 3 mm away from the path of the tool axis and 0.25 mm above the bottom surface of the workpiece. As mentioned previously, in butt friction stir welding of 6040 Al to AZ31 Mg without tool offset, higher peak temperatures (50° C. higher on the advancing side and 30° C. on the retreating side) were observed with 6040 Al on the advancing side, which are consistent with welds B-3 and B-5 in FIG. 14.

Figure 15A:
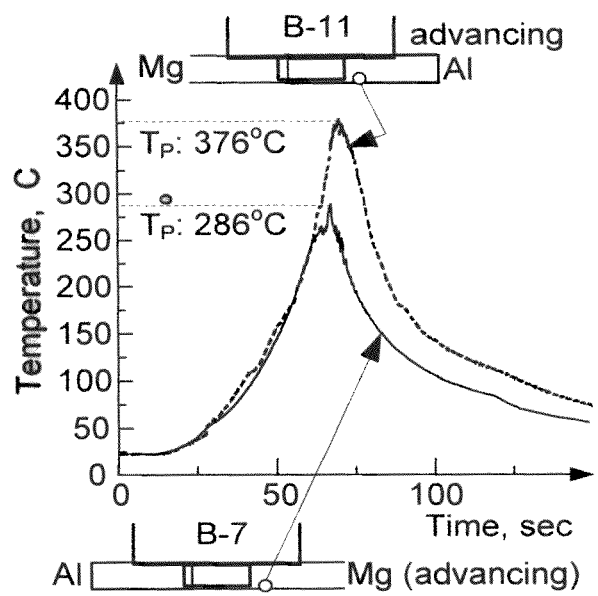
FIGS. 15A and 15B are graphical comparisons of thermal cycles measured in weld B-7 and B-11 of FIG. 14.
Figure 15B:
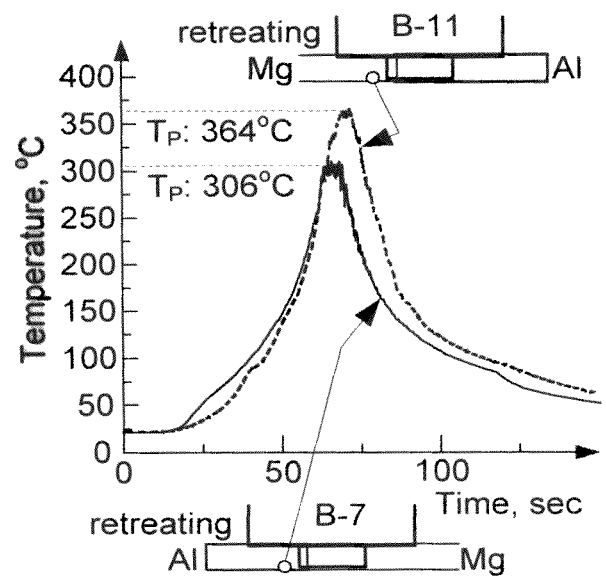

FIGS. 15A and 15B compares the thermal cycles measured in welds B-7 and B-11. In weld B-11, where Al is on the advancing side, the peak temperature is 376° C. on the advancing side and 364° C. on the retreating side, the average being 370° C. In weld B-7, where Mg is on the advancing side, the peak temperature is 286° C. on the advancing side and 306° C. on the retreating side, the average being 296° C., which is 74° C. lower than the average peak temperature of 370° C. in weld B-11. In similar-metal butt friction stir welding, as mentioned previously, the peak temperature is higher on the advancing side. However, weld B-7 (and weld B-5 as well) shows that this can be reversed in dissimilar-metal butt friction stir welding.

As shown in FIG. 14, weld B-11 is significantly weaker than weld B-3, weld B-3 is significantly weaker than weld B-5, and weld B-5 is similar to weld B-7 in strength. A similar pattern exists in the measured average temperatures. Thus, a close correlation seems to exist between increasing heat input and decreasing joint strength. Liquation increases with increasing heat input or temperature. With more liquation, more liquid can form along the Al/Mg interface to promote cracking under the shearing action of the tool and form brittle intermetallics both along the interface and grain boundaries inside the stir zone upon cooling. The joint strength can be significantly reduced.

Although FIG. 14 can explain how material positions can affect the joint strength through the heat input and hence liquation, other factors may also affect the joint strength. For instance, interlocking between Mg and Al can improve the joint strength, so can similar-metal bonding (such as Al-to-Al and Mg-to-Mg, as will be shown subsequently in modified lap welding). On the other hand, excessive mixing between Al and Mg can provide more interface area for Al to react with Mg to cause liquation and decrease the joint strength.

Figure 16A:
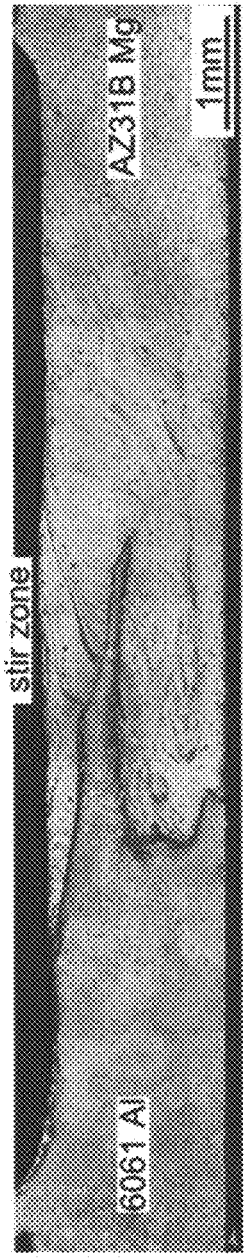
FIGS. 16A and 16B are color photographs of transverse cross-sections of welds B-7 and weld B-11, respectively.
Figure 16B:
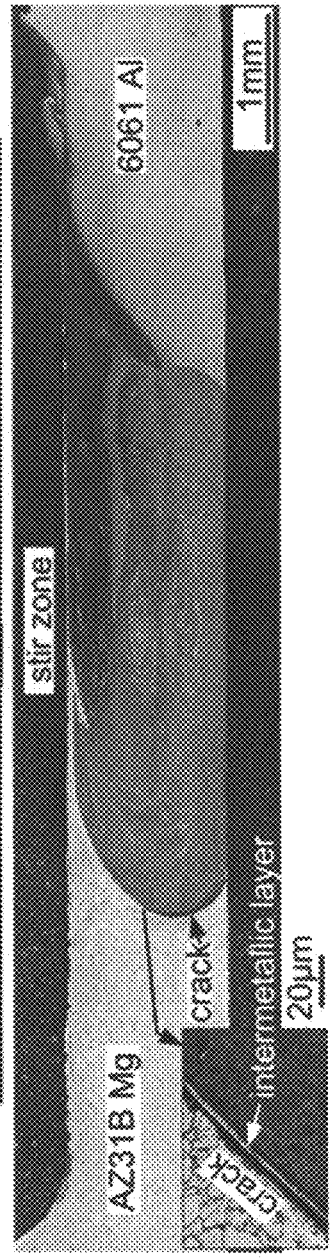

FIGS. 16A and 16B are transverse cross-sections of welds B-7 and weld B-11, respectively. The Al/tool contact area in weld B-7 is the same as the Mg/tool contact area in weld B-11. In weld B-7 Al penetrates deep into the stir zone, which can promote interlocking and improve the joint strength. However, there is no Mg penetration into the stir zone in weld B-11. In fact, a long open crack exists along the interface between Mg and the stir zone over half the thickness of the workpiece. There might be two reasons for the differences. First, with its good deformability Al can move to the back of the rotating tool from the retreating side even though shearing is less there than the advancing side. Computer simulation has shown that material particles at the advancing side can enter into the retreating side but not the other way around. With its lower deformability, however, Mg is less able to move far away from the retreating side. Second, the higher heat input and hence liquation in weld B-11 could have caused a continuous liquid film to exist along the interface between Mg and the stir zone over half the thickness of the workpiece. The slippage caused by the liquid film could have kept Mg from being dragged deep into the stir zone. The large open crack and the continuous intermetallic layer along the interface both suggest liquation there. The crack caused weld B-11 to break even before tensile testing. Thus, lack of interlocking caused by unfavorable material flow and more liquation caused by the higher heat input could have both contributed to the low joint strength of weld B-11. The microstructure of weld B-3 (not shown) indicated heavy liquation within the stir zone due to relatively high heating and excessive mixing between Al and Mg caused by zero offset (equal volume of Al and Mg exposed to the pin).

Single-Pass Conventional Lap Welding

Figure 17:
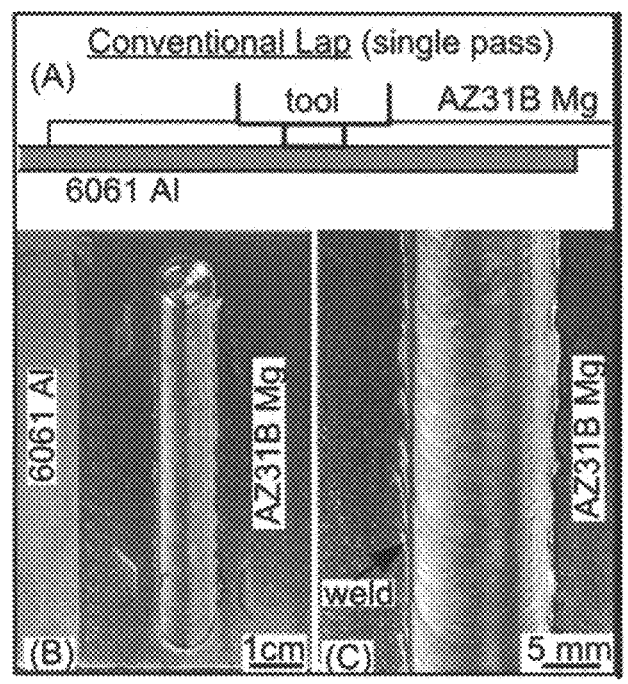
FIG. 17 provides a diagram and two color photographs of a single-pass conventional lap weld of an aluminum alloy and a magnesium alloy wherein the magnesium alloy is on top (CL-2 of FIG. 18).
Figure 18:
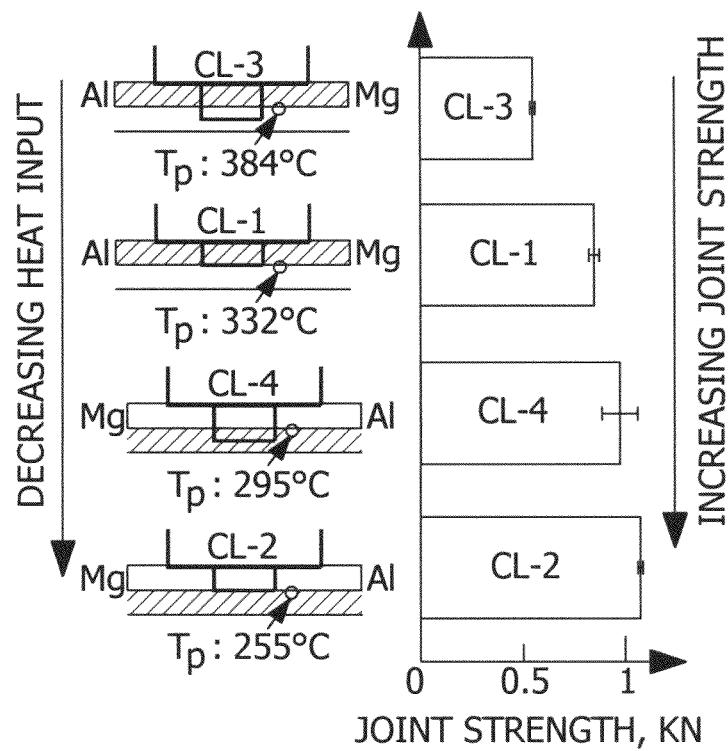
FIG. 18 is a diagram illustrating the effect of material positions on the joint strength in lap friction stir welding of an aluminum alloy and a magnesium alloy.

FIG. 17 shows a single-pass conventional lap weld with AZ31 Mg on the top (CL-2). The effect of material positions on the joint strength in single-pass conventional lap friction stir welding is shown in FIG. 18. First, material positions have a significant effect on the joint strength. The difference can be a factor of two. Second, the strength is higher with AZ31 Mg on the top. Third, the strength is higher with the 1.5 mm pin length than 2.3 mm. Fourth, for dissimilar-metal friction stir welding between AZ31 Mg and 6061 Al, the highest strength in a conventional lap weld (CL-2) is much lower than that in a butt weld (B-7 in FIG. 14), about one half Butt welds are stronger mainly because lap welds are subjected to shearing/peeling forces during tensile testing while butt welds are not.

The effect of material positions on the heat input in conventional lap friction stir welding of 6xxx Al to AZ or AM Mg is predicted in FIG. 18. According to Hypothesis 2, with the same tool at the same rotation speed and travel speed, a higher heat input can be expected with a larger Al/tool contact area, that is, with 6xxx Al on the top to increase the Al/tool contact area. Thus, a higher heat input can be expected in welds CL-3 and CL-1 than in welds CL-4 and CL-2. With a longer pin penetrating into the lower sheet, a higher heat input can be expected in weld CL-3 than weld CL-1 and in weld CL-4 than weld CL-2.

To verify that the heat input is higher with Al on the top and with a longer pin, temperature measurements were conducted. The thermocouples were located 3 mm away from the path of the tool axis and 0.25 mm below the top surface of the lower sheet. As shown in FIG. 18, the peak temperature is 77° C. higher with 6061 Al on the top (weld CL-1) than at the bottom (weld CL-2). Thus, this confirms the higher heat input in Al-to-Mg lap friction stir welding with Al on the top. Furthermore, the peak temperatures are higher with a longer pin, that is, 52° C. higher in weld CL-3 than CL-1 and 40° C. higher in weld CL-4 than CL-2.

FIGS. 19A and 19B show transverse cross-sections of welds CL-1 and CL-2, respectively. In weld CL-1 (FIG. 19A) thick intermetallic compounds and a crack are present along the interface between the Al stir zone and the AZ31 Mg at the bottom. The brittle intermetallics and the crack must have contributed to the low joint strength of the weld. As mentioned previously, it has been observed in lap friction stir welding a very thick layer of intermetallics at the interface between Al-7.5Si (top) and AZ31 Mg (bottom) even though the pin never touched AZ31 Mg. Thus, slight or no pin penetration into AZ31 Mg does not really matter much. Instead, putting AZ31 Mg on the top might work better (as shown by weld CL-2).

EDX (energy-dispersive x-ray) analysis showed the lighter layer next to 6061 Al (inset on right) contained about 39 wt % Mg, which is close to the 37 wt % Mg for $Al_3Mg_2$. The darker layer next to AZ31 Mg contained about 63 wt % Mg, which is reasonably close to the 57 wt % Mg for $Al_{12}Mg_{17}$. EPMA (electron probe microanalysis) confirmed the compositions. X-ray diffraction (XRD) also confirmed the presence of $Al_{12}Mg_{17}$ and $Al_3Mg_2$.

The intermetallic layers in weld CL-1 (FIG. 19A) suggests that heating during friction stir welding was high enough to cause Al and Mg to react with each other and form liquid along the interface, that is, constitutional liquation. The Mg near the Al stir zone does not appear to be stirred (no flow lines visible in AZ31 Mg in inset on right), possibly because of the lower deformability of Mg or tool slippage by liquid films formed by liquation or both. Upon cooling, $Al_{12}Mg_{17}$ and $Al_3Mg_2$ formed from the liquid by eutectic reactions (FIG. 12).

EDX showed the particle inside the crack at the interface (inset on left in FIG. 9A) contained about 60 wt % Mg, close to the 57 wt % Mg of $Al_{12}Mg_{17}$. This suggests that liquation occurred here and the liquid film caused the stir zone to be separated from AZ31 Mg under shearing by the rotating tool. (It is worth mentioning that in friction stir welding cavities can form in the stir zone by material flow without liquation.) With a longer pin (2.3 mm instead of 1.5 mm) to penetrate deeper into AZ31 Mg, that is, in weld CL-3, much more intermetallics formed at the interface near the pin tip due to more heating (52° C. higher peak temperature as shown in FIG. 18).

In weld CL-2 (FIG. 19B), the intermetallics are thinner and cracks smaller and shorter along the interface between the Mg stir zone and the 6061 Al at the bottom. The region of 6061 Al next to the Mg stir zone appears to be well stirred (flow lines visible in inset on left). All these suggest that, as compared to weld CL-1, liquation was significantly less, consistent with the lower heat input in weld CL-2 (77° C. lower peak temperature as shown in FIG. 18). With a longer pin to penetrate deeper into 6061 Al than in weld CL-2, that is, in weld CL-4, more cracks and intermetallics formed at the interface near the pin tip due to more heating (40° C. higher peak temperature as shown in FIG. 18).

Single-Pass Modified Lap Welding

Figure 20:
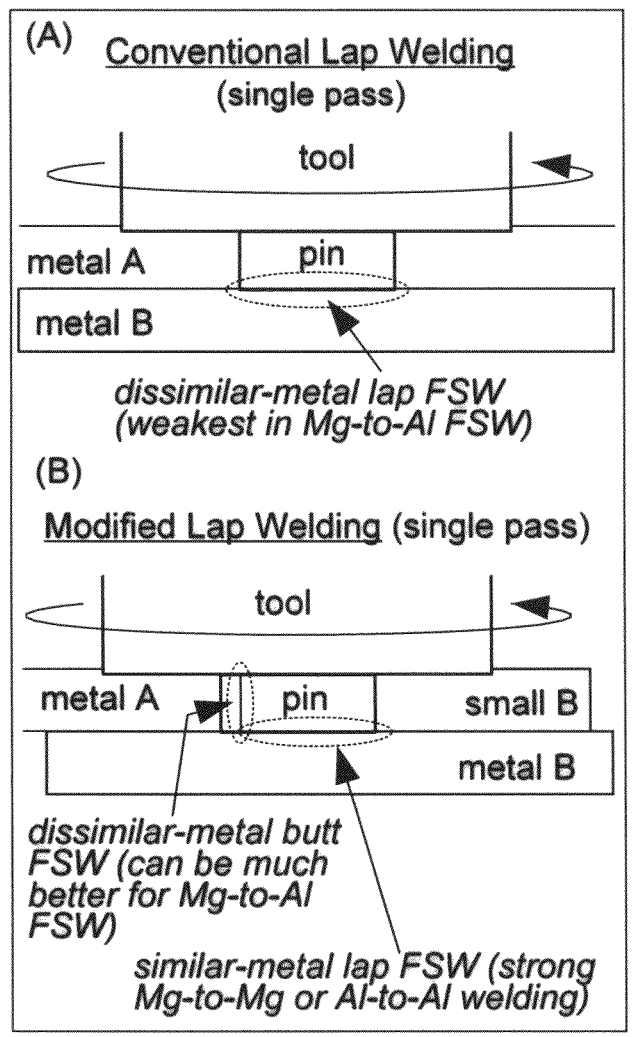
FIG. 20A illustrates a conventional lap friction stir welding process of dissimilar metals.
FIG. 20B illustrates a modified lap friction stir welding process of dissimilar metals.

In order to improve the strength of Al-to-Mg lap welds, conventional lap friction stir welding was modified. FIGS. 20A and 20B are provided for the comparison of conventional lap welding with the modified lap friction stir welding, as described therein, of dissimilar metals A and B. With conventional lap welding (FIG. 20A), metal A is placed on top of metal B. As mentioned previously, with only slight or even no pin penetration into metal B, metals A and B can still react with each other and form a rather thick layer of intermetallics at the interface. With modified lap welding (FIG. 20B), metal A is still placed on top of metal B but with a small piece of metal B next to it. In one example, metal A can be 6061 Al and metal B can be AZ31 Mg or vice versa.

Figure 21:
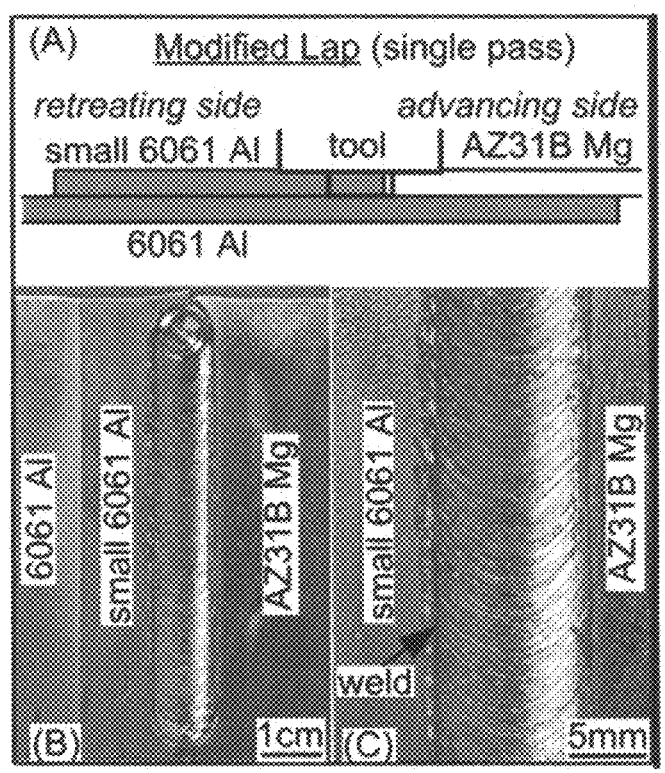
FIG. 21 is a diagram and two color photographs of a single-pass modified lap weld of an aluminum alloy and a magnesium alloy wherein the magnesium alloy and a small piece of the aluminum alloy are on top (ML-2 of FIG. 22).

FIG. 21 shows a single-pass modified lap weld with AZ31 Mg and a small piece of 6061 Al at the top (ML-2). As mentioned previously (FIG. 20B), modified lap welding involves both butt and lap welding. In light of the butt welding result (FIG. 14), all welds were made with AZ31 Mg on the advancing side, either as the top sheet or the small piece at the top.

Figure 22:
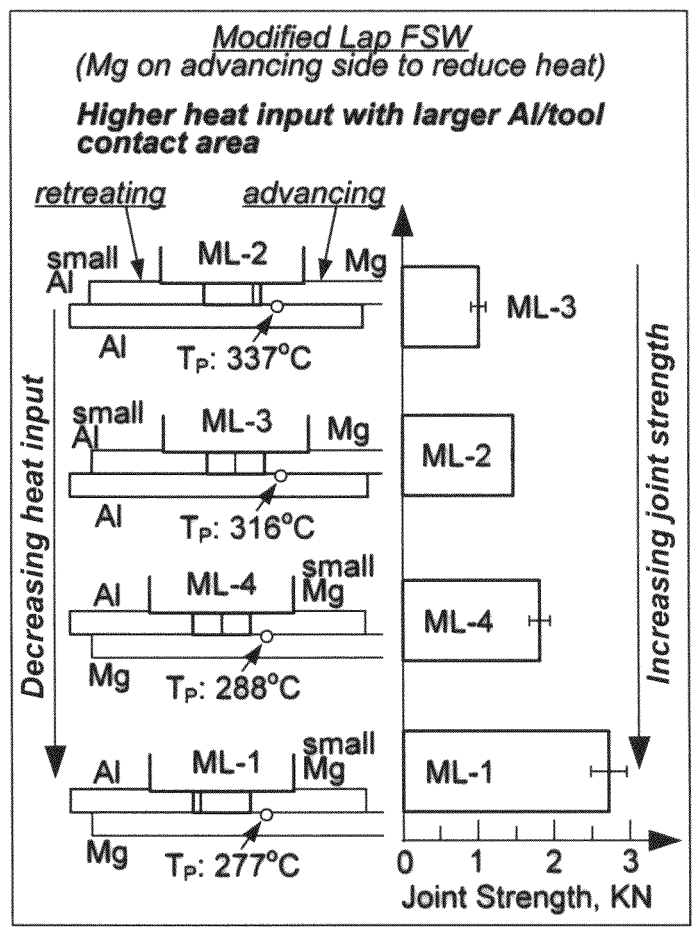
FIG. 22 is a diagram illustrating the effect of material positions on the joint strength in single-pass modified lap friction stir welding of an aluminum alloy and a magnesium alloy.

The effect of material positions on the joint strength in single-pass modified lap friction stir welding is shown in FIG. 22. First, material positions have a significant effect on the joint strength, and the difference can be a factor of two to three. Second, the strength is highest in the weld (ML-1) with a tool offset to the small piece of AZ31 Mg. This is consistent with the butt welding result (FIG. 14). This also allows much Mg-to-Mg lap welding, which is much stronger than Al-to-Mg lap welding because of the absence of cracks and intermetallics. Third, weld ML-1 (2,711N) matched in strength the similar-metal lap weld CL-6 (2,463N as shown in Table 2) between AZ31 Mg and itself.

Figure 23:
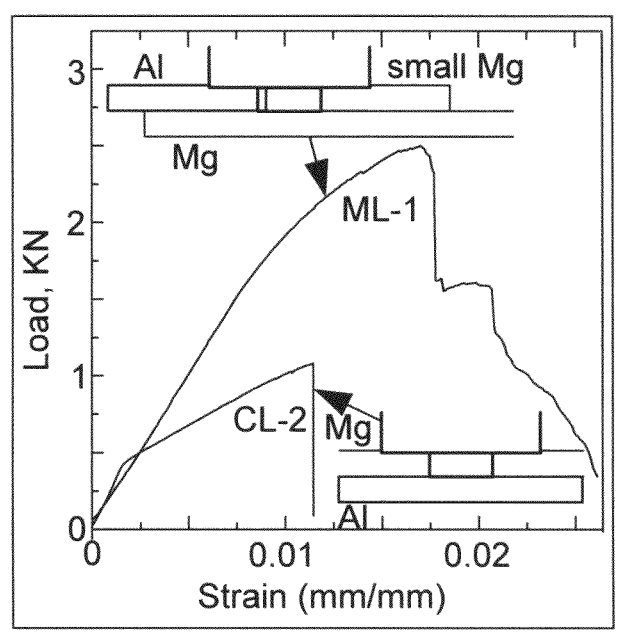
FIG. 23 is a graphical comparison of the tensile test curves of the best single-pass conventional lap weld CL-2 (FIG. 18) and the best single-pass modified lap weld ML-1 (FIG. 22).

FIG. 23 compares the tensile test curves of the best single-pass conventional lap weld CL-2 and the best single-pass modified lap weld ML-1. Weld ML-1 failed at a significantly higher strength and elongation than weld CL-2.

The effect of material positions on the heat input in modified lap friction stir welding is predicted in FIG. 22. According to Hypothesis 2, with the same tool at the same rotation speed and travel speed, a higher heat input can be expected with a larger Al/tool contact area. Since the contact area between Al and the tool (shoulder and pin) decreases in the order of ML-2, ML-3, ML-4 and ML-1, the heat input can be expected to decrease in the same order. This prediction is confirmed by the peak temperatures measured during friction stir welding. The thermocouples were on the advancing side and located 3 mm away from the path of the tool axis and 0.25 mm below the top surface of the lower sheet. Going from weld ML-3 to weld ML-4, the bottom sheet changes from 6061 Al to AZ31 Mg, which is lower in thermal conductivity (167 vs. 96 W/m° C.). The fact that the peak temperature still decreases suggests the effect of thermal conductivity difference is not very significant.

FIGS. 24A and 24B show transverse cross-sections of welds ML-3 and ML-1, respectively. In weld ML-3 (FIG. 24A), Al and Mg interpenetrates deep into each other, and this can be expected to promote interlocking and improve the joint strength. Unfortunately, the heat input was relatively high (FIG. 22) and it caused much liquation and a long crack along most of the Mg—Al interface (see insets). Under the shearing/peeling action inherent during tensile testing of lap welds, the crack can open up easily and lead to premature failure. In weld ML-1 (FIG. 24B), however, there was significantly less heating (FIG. 22) to cause liquation. Furthermore, strong Mg-to-Mg bonding exists at the interface between the stir zone and the bottom sheet without cracks or intermetallics. By the way, the light gray straight lines in AZ31 Mg are twin lines instead of scratches left on the sample due to poor polishing.

As shown in FIG. 22, however, the joint strength increases in the order of ML-3, ML-2, ML-4 and ML-1. That is, weld ML-2 is stronger than weld ML-3 in spite of the higher heat input in the former. As compared to weld ML-3, weld ML-2 allows more of stronger Al-to-Al lap welding and less of weaker Al-to-Mg lap welding. This can explain why weld ML-2 is stronger than weld ML-3.

A weld such as ML-1 can be prepared as follows. 6061 Al sheets, AZ31 Mg sheets, and small AZ31 Mg sheets can be sheared with parallel edges to the predetermined width. With 6061 Al on top of AZ31 Mg and positioned, both can be clamped down simultaneously from one side. After putting the small AZ31 Mg next to 6061 Al and clamping down from the opposite side, the lateral position of the joint line relative to the pin can be fine adjusted just like in butt welding. Since the small AZ31 Mg is free to move, its close fit-up with 6061 Al is guaranteed regardless how precise the dimensions of the sheets are. The small AZ31 Mg can then be butt welded to 6061 Al with pin penetration into the backing plate. This, in fact, can be easier to do than ordinary butt friction stir welding because pin penetration into the backing plate (i.e., support surface) does not have to be avoided.

Dual-Pass Lap Welding

Figure 25:
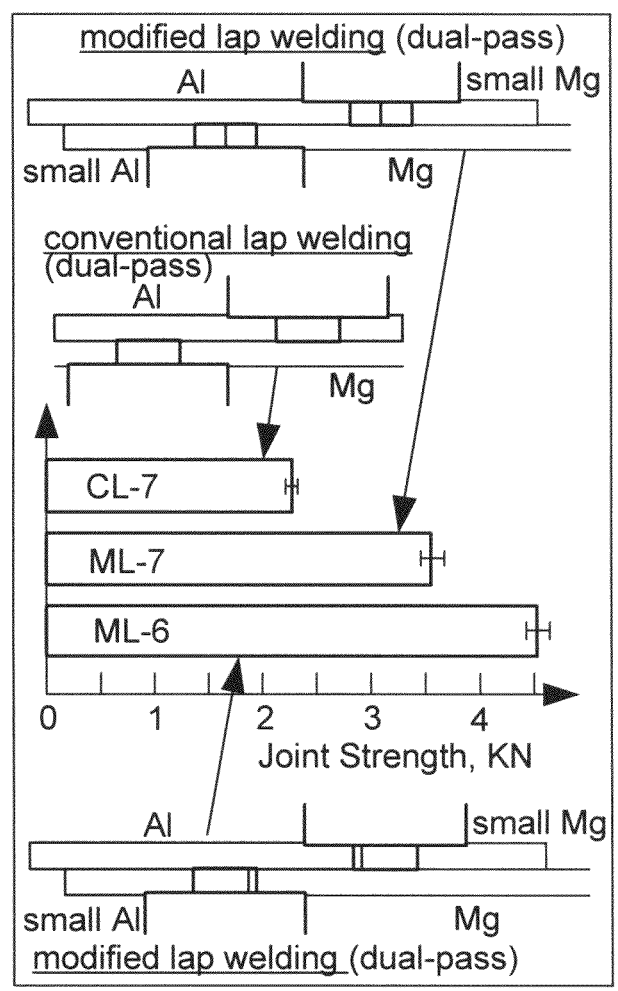
FIG. 25 is a diagram illustrating the effect of material positions on the strength of dual-pass lap welds made between an aluminum alloy and a magnesium alloy.

FIG. 25 shows the effect of material positions on the strength of dual-pass lap welds made between AZ31 Mg and 6061 Al. For modified lap welds, AZ31 Mg was on the advancing side in each pass. Weld ML-6 is stronger than weld ML-7. The first pass (top) in weld ML-6 is equivalent to the single-pass weld ML-1 (FIG. 22), and that in weld ML-7 to the single-pass weld ML-4. Since weld ML-1 is stronger than weld ML-4, the first pass in the dual-pass weld can be expected to be stronger in weld ML-6 than in weld ML-7. The second pass (bottom) in weld ML-6 is equivalent to the single-pass weld ML-2 (FIG. 22), and that in weld ML-7 to the single-pass weld ML-3. Since weld ML-2 is stronger than weld ML-3, the second pass in the dual-pass weld can also be expected to be stronger in weld ML-6 than in weld ML-7.

Figure 26:
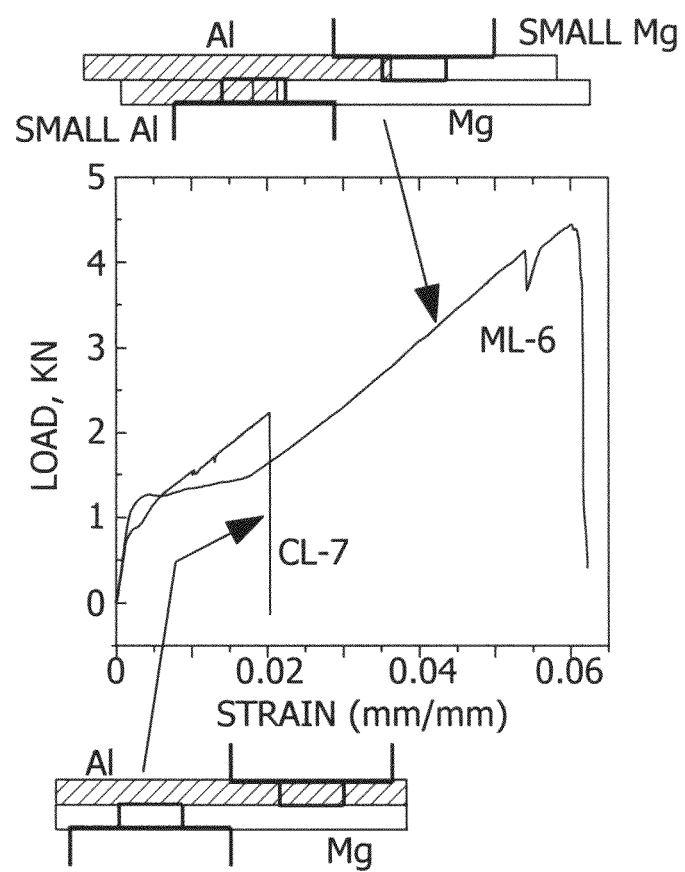
FIG. 26 graphically illustrates a comparison of the tensile test curves of welds CL-7 and ML-6 (FIG. 25).

Weld ML-6 is stronger than the dual-pass conventional lap weld CL-7 by a factor of about two (FIG. 26). This significant difference is consistent with the results shown previously in FIG. 23, where the single-pass modified weld ML-1 is also about twice stronger than the single-pass conventional lap weld CL-2. The tensile test curves of welds CL-7 and ML-6 are shown in FIG. 26. Weld ML-6 fails at a much higher strain as well as load. Weld CL-7 failed through the weld as all other cases, but weld ML-6 failed in the 6061 Al base metal. This is the advantage of dual-pass modified lap welds since failure in the base metal is an assurance of strong bonding.

Modified Friction Stir Spot Welding

Figure 27:
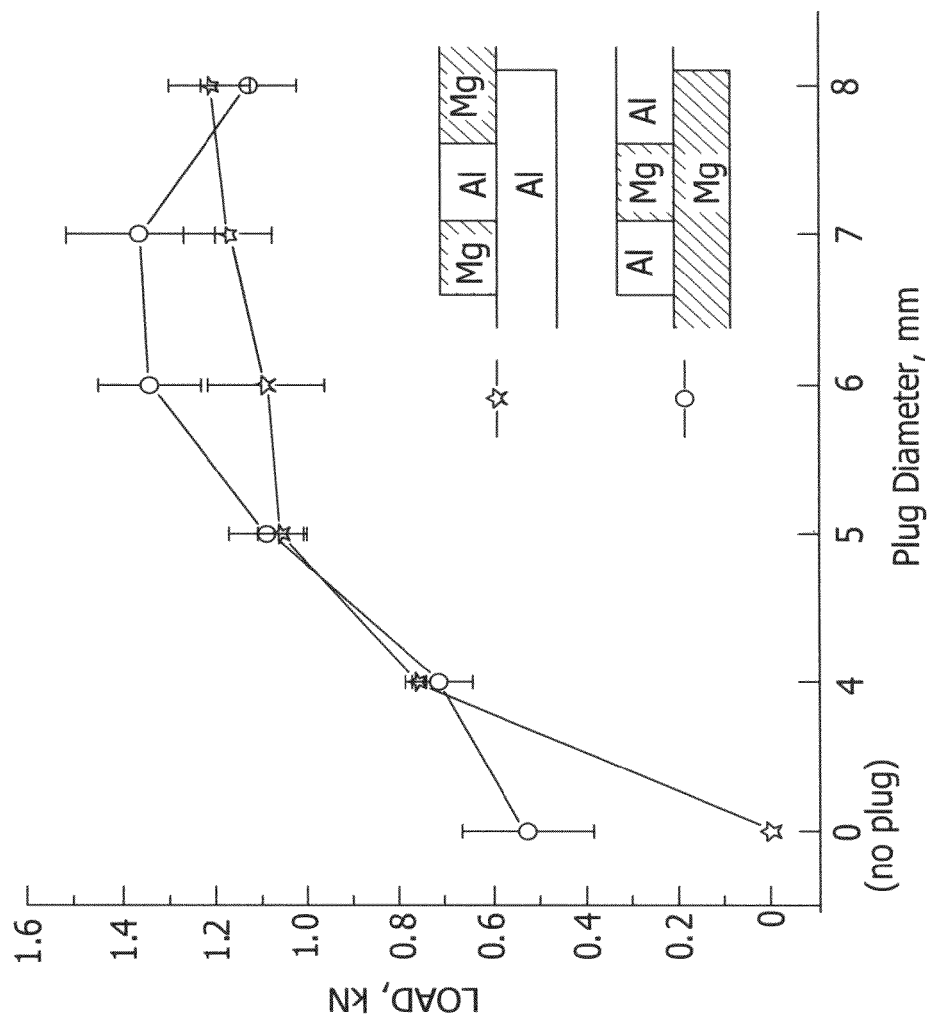
FIG. 27 graphically illustrates a comparison of the tensile test strength and plug diameter using friction stir spot welding.

FIG. 27 graphically illustrates tensile test strength results from modified friction stir spot welding of 1.6 mm thick 6061 Al to 1.6 mm thick AZ31 Mg. The welding was done with a tool having 1 cm shoulder diameter, 4 mm pin diameter, and 1.3 mm pin length at 1400 rpm rotation speed with 5 second dwell time after reaching the desired penetration. Specifically, a hole was drilled (or punched) in the upper sheet, the upper sheet was then put on top of the lower sheet, and a plug of the lower sheet material is inserted into the hole in the upper sheet. The rotating pin was plunged into the plug to stir and cause bonding. Deep pin penetration into the lower sheet is not required and in fact, not desired. It is believed that better joint strength is achieved with the pin tip at or even slightly above the joint line (i.e., the original interface between the plug and the lower sheet). With reference to FIG. 27, the stars denote the upper sheet is AZ31 Mg and its holes are filled with 6061 Al plugs. Contrarily, the circles denote the upper sheet is 6061 Al and its holes are filled with AZ31 Mg plugs.

A zero disc diameter, also indicated by "no plug" on FIG. 27, means conventional spot welding, that is, no holes or plugs was used to weld the Al and Mg sheets together. During convention friction stir spot welding, the rotating pin is plunged into the upper sheet until the shoulder rubs on the upper sheet to generate sufficient friction heat and plasticize the workpiece material. The pin tip penetrates into the lower sheet to cause stirring and bonding between the upper and lower sheets. A keyhole (or crater) is left after the tool is withdrawn. When joining dissimilar metals by conventional friction strip sport welding, pin penetration into the lower sheet should be minimized in order to minimize the reaction between metal to form liquid, which causes cracking and the formation of brittle intermetallic compounds. So, the pin length should be such that the pin tip penetrates the lower sheet slightly when the shoulder rubs on the upper sheet.

How the material positions affect the joint strength of the resultant weld depends significantly on how they affect the heat input and material flow during friction stir welding, both of which affect the formation of defects and hence the joint strength. At lower travel speeds and higher rotation speeds, more heat is generated to cause liquation and hence cracking and intermetallic compounds to weaken the resultant weld. So, the heat input is likely to play a bigger role than materials flow. At higher travel speeds and lower rotation speeds, on the other hand, less heat is generated to cause liquation. However, the materials may not be warm enough for sufficient plastic flow to keep channels from forming and weakening the resultant weld. So, material flow is likely play a bigger role than the heat input. In the present study, the travel speed was set to 38 mm/min, which is low, and the rotation speed was set to 1,400 rpm, which is intermediate. The results indicate that the heat input plays a bigger role than material flow in most cases.

Within the range of experimental conditions in the present study, the following conclusions, which can be useful for structure design in friction stir welding of dissimilar metals can be drawn:

Conventional lap welding of metal A at top to metal B at bottom can be modified to improve the joint strength by butt welding a small piece of metal B to metal A with pin penetration into the metal B at the bottom (which can be easier to do than ordinary butt welding because pin penetration into the backing plate is not a problem here). The highest joint strength in Al-to-Mg modified lap friction stir welding can double that in conventional lap friction stir welding and match that in Mg-to-Mg lap friction stir welding. This is because similar-metal bonding, which is stronger than dissimilar-metal bonding, can exist over most or the interface between the stir zone and the bottom piece in modified lap welding.

A significant effect of material positions on the joint strength has been demonstrated in Al-to-Mg butt, conventional lap and modified lap friction stir welding, affecting the joint strength by a factor of two or more.

The effect of material positions on the heat input has been predicted and confirmed with temperature measurements during Al-to-Mg butt, lap and modified lap friction stir welding. This helps better understand the effect of material positions on the joint strength because the heat input affects the formation of liquid and hence cracks and brittle intermetallic compounds.

If the heat input is higher in A-to-A friction stir welding than in B-to-B friction stir welding under identical welding conditions, the heat input in A-to-B friction stir welding can be higher with A on the advancing side (in butt friction stir welding) and with a larger A/tool contact area (that is, with tool offset to A in butt friction stir welding or with A at the top in lap friction stir welding).

A three-step color etching procedure has been developed to show Mg, Al, $Al_3Mg_2$ and $Al_{12}Mg_{17}$ all in different colors, thus enabling clear interpretation of the microstructural constituents, material flow, mixing, and evidence of liquation.

Material positions that favor a lower heat input can be used to increase the joint strength (as long as the heat input is not too low, e.g., at high travel speeds or low rotation speeds, to maintain sufficient plastic material flow to prevent channels from forming and weakening the resultant weld).

In butt friction stir welding of 6xxx Al to AZ or AM Mg, the following material positions favor a lower heat input: Mg on the advancing side and Al on the retreating side, with tool offset to Mg.

In conventional lap friction stir welding of 6xxx Al to AZ or AM Mg, the following material positions favor a lower heat input: Mg on the top and Al at the bottom, with slight (e.g., 0.1 mm) pin penetration into Al.

In modified lap friction stir welding of 6xxx Al to AZ or AM Mg, the following material positions favor a lower heat input: Mg at the bottom, Al on the top on the retreating side, and a small piece of Mg on the top on the advancing side, to which the tool offsets.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A workpiece assembly comprising:
a first piece of a first metal;
a first piece of a second metal overlying at least a portion of the first piece of first metal;
a second piece of the first metal overlying the first piece of first metal and in side-to-side relationship with the first piece of second metal; and
a weld seam securely joining the first piece of first metal, the first piece of second metal, and the second piece of first metal together, the weld seam being defined by a stirred mixture of the first metal and the second metal and extending between the first piece of second metal and the second piece of first metal, wherein the first metal is dissimilar from the second metal, and wherein the weld seam does not extend through the first piece of the first metal.

2. The workpiece assembly of claim 1 wherein the weld seam is offset toward the second piece of first metal.

3. The workpiece assembly of claim 1 wherein the first metal is a first metal alloy and the second metal is a second metal alloy that is dissimilar from the first metal alloy.

4. The workpiece assembly of claim 3 wherein the first metal is a magnesium alloy and the second metal is an aluminum alloy.

5. The workpiece assembly of claim 4 wherein the weld seam is defined by a stirred mixture of magnesium and aluminum alloys.

6. The workpiece assembly of claim 1 wherein the second piece of the first metal has a width that is substantially less than a width of the first piece of the first metal.

7. The workpiece assembly of claim 6 wherein the width of the second piece of the first metal is substantially less than a width of the first piece of the second metal.

8. The workpiece assembly of claim 1 further comprising a second piece of the second metal, a second piece of the second metal overlying the first piece of second metal and in side-to-side relationship with the first piece of first metal, and a second weld seam securely joining the first piece of first metal, the first piece of second metal, and the second piece of second metal together.

9. The workpiece assembly of claim 8 wherein the second weld seam is defined by a stirred mixture of the first metal and the second metal and extends between the first piece of second metal and the second piece of first metal.

10. The workpiece assembly of claim 8 wherein the second weld seam is defined by a lap weld.

11. The workpiece assembly of claim 1 wherein the first piece of the first metal has a thickness and the first piece of the second metal has a thickness, the total thickness of the workpiece assembly being equal to the sum of the thickness of the first piece of the first metal and the thickness of the first piece of the second metal.

12. The workpiece assembly of claim 1 wherein a portion of the weld seam securely joins the second piece of the first metal and the first piece of the second metal, this portion of the weld seam being visible for inspection.

13. The workpiece assembly of claim 1 wherein the weld seam has a strength of about 2,700 Newtons.

14. The workpiece assembly of claim 8 wherein the weld seam and the second weld seam have a combined strength between about 3,550 Newtons and about 4,530 Newtons.

15. The workpiece assembly of claim 1 wherein the weld seam is generally straight.

* * * * *